(12) United States Patent
Tsuchihashi et al.

(10) Patent No.: US 10,776,392 B2
(45) Date of Patent: Sep. 15, 2020

(54) APPARATUS AND METHOD TO ESTABLISH A CONNECTION BETWEEN APPARATUSES WHILE SYNCHRONIZATION OF CONNECTION INFORMATION THEREOF IS SUSPENDED

(71) Applicant: FUJITSU LIMITED, Kawasaki-shi, Kanagawa (JP)

(72) Inventors: Rui Tsuchihashi, Numazu (JP); Koichi Miura, Numazu (JP); Toshiaki Yamada, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 596 days.

(21) Appl. No.: 15/651,051

(22) Filed: Jul. 17, 2017

(65) Prior Publication Data
US 2018/0025067 A1  Jan. 25, 2018

(30) Foreign Application Priority Data

Jul. 20, 2016  (JP) .................. 2016-142090

(51) Int. Cl.
*G06F 16/30*  (2019.01)
*G06F 16/27*  (2019.01)
(Continued)

(52) U.S. Cl.
CPC ............ *G06F 16/275* (2019.01); *G06F 16/10* (2019.01); *G06F 16/23* (2019.01); *G06F 16/27* (2019.01)

(58) Field of Classification Search
CPC ......... G06F 17/30067; G06F 17/30002; G06F 17/30283; G06F 17/30581
(Continued)

(56) References Cited

U.S. PATENT DOCUMENTS 5,822,319 A * 10/1998 Nagami .................. H04L 45/10
370/392
6,172,991 B1 * 1/2001 Mori .................. H04Q 11/0478
370/389
(Continued)

FOREIGN PATENT DOCUMENTS

JP  2013088855 A  *  5/2013
JP  2013242739 A  *  12/2013
(Continued)

*Primary Examiner* — Hosain T Alam
*Assistant Examiner* — Robert F May
(74) *Attorney, Agent, or Firm* — Xsensus LLP

(57) ABSTRACT

A first apparatus includes a memory configured to store first connection information in association with each of connections established between the first apparatus and a second apparatus. The first apparatus synchronizes the first connection information stored in the memory with second connection information that is managed by the second apparatus. When a connection is to be established between the first apparatus and the second apparatus while synchronization of the first connection information performed by the processor is suspended, the first apparatus generates first unique information that is unique at least between the first apparatus and the second apparatus, and transmits the generated first unique information to the second apparatus, and establishes, based on the first unique information, a connection between the first apparatus and the second apparatus.

9 Claims, 29 Drawing Sheets

(51) Int. Cl.
    *G06F 16/10*     (2019.01)
    *G06F 16/23*     (2019.01)
(58) Field of Classification Search
    USPC .......................................................... 707/761
    See application file for complete search history.

(56) References Cited

U.S. PATENT DOCUMENTS

| | | | |
|---|---|---|---|
| 9,021,116 B2* | 4/2015 | Kotha | H04L 12/56 |
| | | | 709/230 |
| 2005/0015427 A1* | 1/2005 | Guo | H04L 61/2571 |
| | | | 709/200 |
| 2006/0242206 A1* | 10/2006 | Brezak | G06F 16/1787 |
| 2009/0171977 A1* | 7/2009 | Park | H04L 67/24 |
| 2013/0275996 A1* | 10/2013 | Kurihara | G06F 9/52 |
| | | | 718/106 |
| 2015/0222431 A1* | 8/2015 | Guido van Rossum | |
| | | | H04L 63/1441 |
| | | | 380/46 |
| 2017/0085683 A1* | 3/2017 | Herr | H04L 43/0894 |

FOREIGN PATENT DOCUMENTS

| | | |
|---|---|---|
| JP | 2014-48969 | 3/2014 |
| JP | 2015-103094 | 6/2015 |
| JP | 2015-191246 | 11/2015 |

* cited by examiner

| SYSTEM NUMBER | SYSTEM NAME |
|---|---|
| 1 | AZ1 |
| 2 | AZ2 |

FIG. 6

| CONNECTOR ID | VIRTUAL ROUTER ID |
|---|---|
| NetworkConnector1 | vrouter1 |
| NetworkConnector2 | vrouter2 |
| NetworkConnector3 | vrouter3 |
| NetworkConnector4 | vrouter4 |
| NetworkConnector5 | vrouter5 |
| NetworkConnector6 | vrouter6 |
| NetworkConnector7 | vrouter7 |
| NetworkConnector8 | vrouter8 |
| NetworkConnector9 | vrouter9 |
| NetworkConnector10 | vrouter10 |

FIG. 9

| CONNECTOR ID | DISPENSING FLAG | IDENTIFIER | SYSTEM WHICH DISPENSES ID | SYSTEM WHICH IS CAPABLE OF USING ID |
|---|---|---|---|---|
| NetworkConnector1 | 1 | X1 | 1 | |
| NetworkConnector2 | 1 | X2 | 1 | |
| NetworkConnector3 | 1 | X3 | 1 | |
| NetworkConnector4 | 1 | X4 | 2 | |
| NetworkConnector5 | 1 | X5 | 2 | |
| NetworkConnector6 | 1 | X6 | 3 | |
| NetworkConnector7 | 0 | | | 1 |
| NetworkConnector8 | 0 | | | 1 |
| NetworkConnector9 | 0 | | | 1 |
| NetworkConnector10 | 0 | | | 1 |
| NetworkConnector11 | 0 | | | 1 |
| NetworkConnector12 | 0 | | | 1 |
| NetworkConnector13 | 0 | | | 2 |
| NetworkConnector14 | 0 | | | 2 |
| NetworkConnector15 | 0 | | | 2 |
| NetworkConnector16 | 0 | | | 2 |
| NetworkConnector17 | 0 | | | 3 |
| NetworkConnector18 | 0 | | | 3 |

FIG. 18

| FLAG | VALUE |
| --- | --- |
| SYNCHRONIZATION PROCESS FLAG IN USABLE RANGE | ON |
| SYNCHRONIZATION SUCCESS FLAG IN USABLE RANGE | OFF |
| SYNCHRONIZATION PROCESS FLAG OUT OF USABLE RANGE | ON |
| SYNCHRONIZATION SUCCESS FLAG OUT OF USABLE RANGE | ON |

FIG. 19

| | | SYNCHRONIZATION SUCCESS FLAG IN USABLE RANGE | |
| --- | --- | --- | --- |
| | | ON | OFF |
| SYNCHRONIZATION SUCCESS FLAG OUT OF USABLE RANGE | ON | (1) | (2) |
| | OFF | (3) | (4) |

FIG. 29

| ENDPOINT ID | CONNECTOR ID | IDENTIFIER | SYNCHRONIZATION FLAG |
|---|---|---|---|
| endpoint1 | NetworkConnector1 | X1 | On |
| endpoint2 | NetworkConnector3 | X3 | On |
| endpoint3 | NetworkConnector2 | X2 | On |
| endpoint4 | NetworkConnector4 | X4 | Off |
| endpoint5 | NetworkConnector5 | X5 | On |

FIG. 30

| ENDPOINT ID | VIRTUAL ROUTER ID |
|---|---|
| endpoint1 | vrouter1 |
| endpoint2 | vrouter2 |
| endpoint3 | vrouter3 |
| ⋮ | ⋮ |

APPARATUS AND METHOD TO ESTABLISH A CONNECTION BETWEEN APPARATUSES WHILE SYNCHRONIZATION OF CONNECTION INFORMATION THEREOF IS SUSPENDED

CROSS-REFERENCE TO RELATED APPLICATION

This application is based upon and claims the benefit of priority of the prior Japanese Patent Application No. 2016-142090, filed on Jul. 20, 2016, the entire contents of which are incorporated herein by reference.

FIELD

The embodiments discussed herein are related to apparatus and method to establish a connection between first and second apparatuses while synchronization of connection information thereof is suspended.

BACKGROUND

A technique is known which makes a database redundant among a plurality of information processing devices. For example, a certain document discloses a technique in which a master server includes a session table where information for a session is registered and a replica server duplicates the session table of the master server.

However, in a case where information for connection of information processing devices is registered in a database and communication which is performed to synchronize the database stops due to communication obstacles, the connection between the information processing devices might not be regularly established.

Japanese Laid-open Patent Publication No. 2014-48969 is an example of the related art.

SUMMARY

According to an aspect of the invention, a first apparatus includes a memory configured to store first connection information in association with each of connections established between the first apparatus and a second apparatus. The first apparatus synchronizes the first connection information stored in the memory with second connection information that is managed by the second apparatus. When a connection is to be established between the first apparatus and the second apparatus while synchronization of the first connection information performed by the processor is suspended, the first apparatus generates first unique information that is unique at least between the first apparatus and the second apparatus, and transmits the generated first unique information to the second apparatus, and establishes, based on the first unique information, a connection between the first apparatus and the second apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a first correspondence table, according to an embodiment;

FIG. 9 is a diagram illustrating an example of a table synchronization process and a table division process, according to an embodiment;

FIG. 18 is a diagram illustrating an example of a synchronization table, according to an embodiment;

FIG. 19 is a diagram illustrating an example of a combination of a value of a synchronization success flag in a usable range and a value of a synchronization success flag out of the usable range, according to an embodiment;

FIG. 29 is a diagram illustrating an example of an endpoint table, according to an embodiment;

FIG. 30 is a diagram illustrating an example of a second correspondence table, according to an embodiment;

DESCRIPTION OF EMBODIMENTS

An aspect of the disclosure provides a technique which establishes connection between devices even in a case where it is difficult to synchronize a database which stores information for the connection between the devices.

Figure 1:
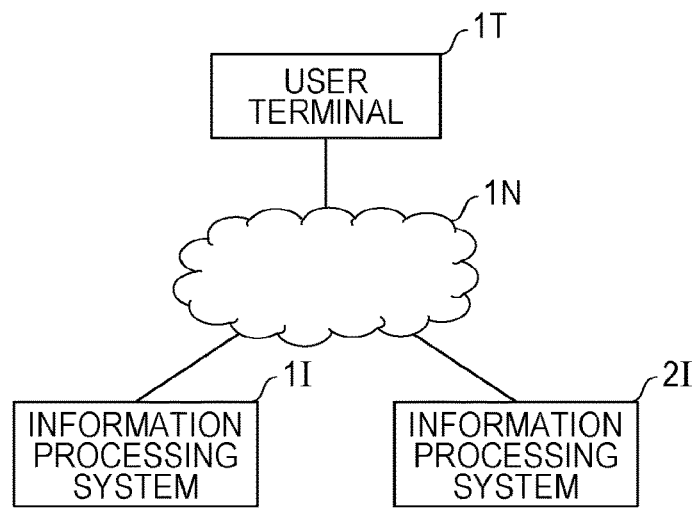
FIG. 1 is a diagram illustrating an example of a configuration of a network, according to an embodiment.

FIG. 1 illustrates a configuration of a network according to an embodiment. For example, an information processing system 1I and an information processing system 2I and a user terminal 1T are coupled to a network 1N which is the internet. An operator of the user terminal 1T is a user of resources of the information processing system 1I and the information processing system 2I, and uses, for example, a virtual machine which is executed on the information processing system 1I and the information processing system 2I. The information processing system 1I and the information processing system 2I are realized by, for example, OpenStack. In the user terminal 1T, an application for the user is executed, and a process is executed in the information processing system 1I and the information processing system 2I according to an application programming interface (API) issued from the application.

Although the number of information processing systems is 2 and the number of user terminals is 1 in FIG. 1, the numbers are not limited thereto.

Figure 2:
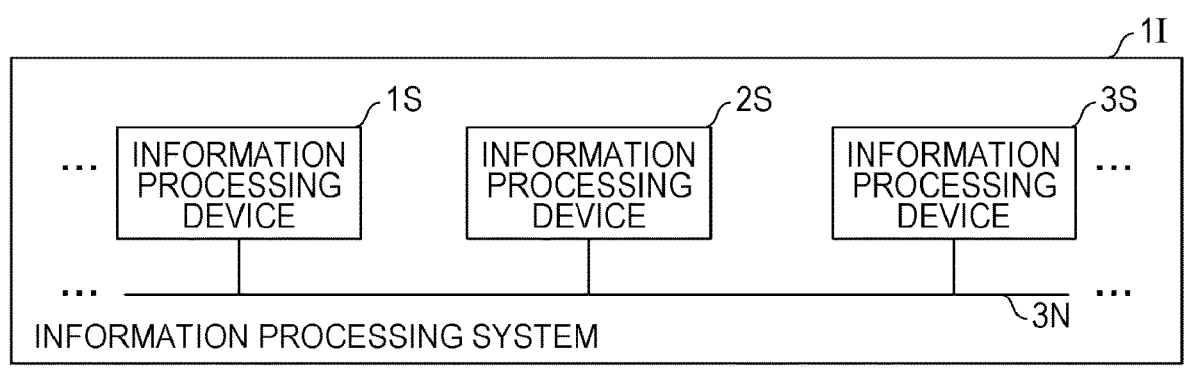
FIG. 2 is a diagram illustrating an example of a system of an information processing system, according to an embodiment.

FIG. 2 illustrates a system outline of the information processing system 1I. The information processing system 1I includes information processing devices 1S to 3S. The information processing devices 1S to 3S are coupled through, for example, a network 3N which is a local area network (LAN).

Although the number of information processing devices is 3 in FIG. 2, the number is not limited thereto. In addition, a device, such as a physical switch, may be provided in the information processing system 1I.

Since a system outline of the information processing system 2I is the same as the system outline of the information processing system 1I, the description thereof will not be repeated.

Figure 3:
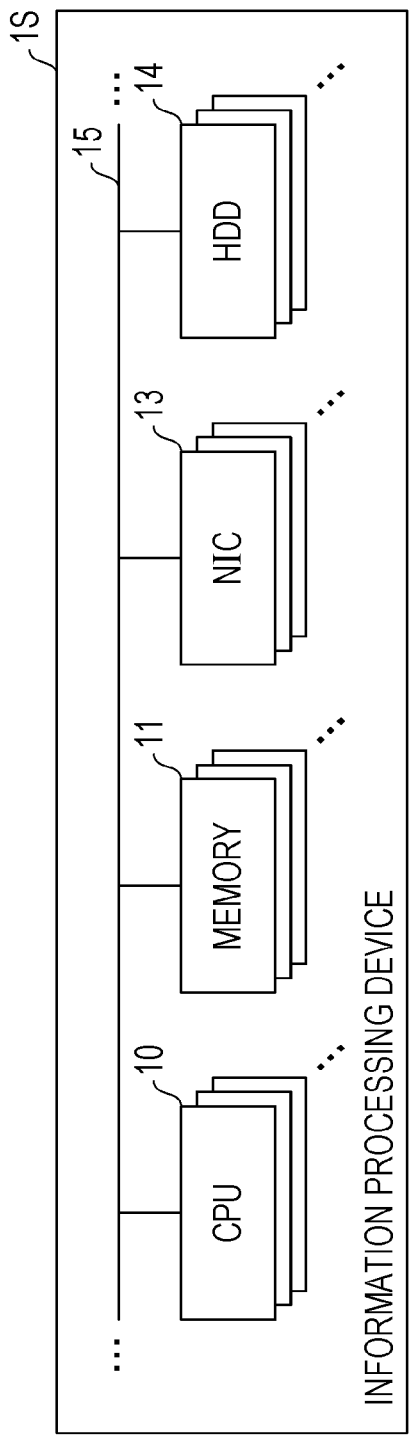
FIG. 3 is a diagram illustrating an example of a hardware configuration of an information processing device, according to an embodiment.

FIG. 3 is a diagram illustrating a hardware configuration of the information processing device 1S. For example, the information processing device 1S, which is a physical server, includes one or more central processing units (CPUs) 10, one or more memories (for example, dual inline memory modules (DIMMs)) 11, one or more network interface cards (NICs) 13, one or more hard disk drives (HDDs) 14, and a bus 15.

Since hardware configurations of the information processing device 2S and the information processing device 3S are the same as the hardware configuration of the information processing device 1S, the description thereof will not be repeated.

Figures 4, 5:
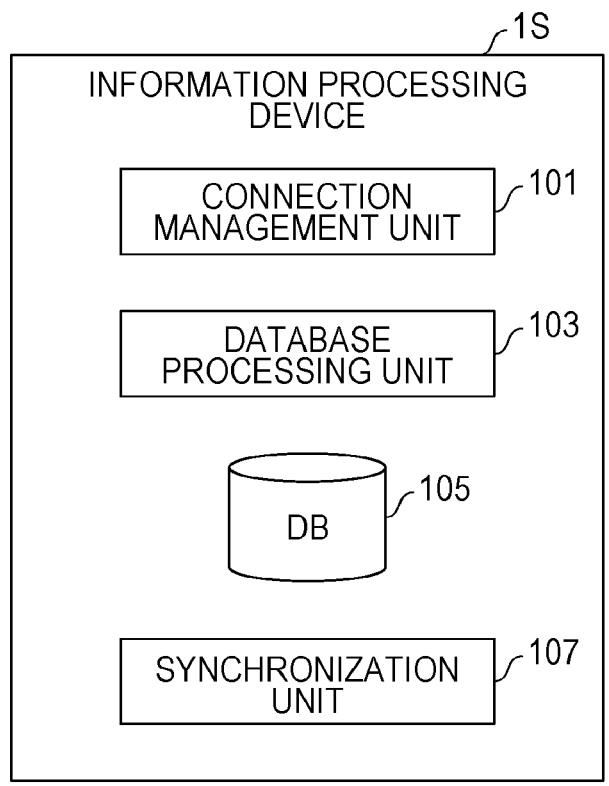
FIG. 4 is a diagram illustrating an example of a functional configuration of an information processing device, according to an embodiment.
FIG. 5 is a diagram illustrating an example of a system table, according to an embodiment.

A program which executes a process according to the embodiment is stored in, for example, the HDD 14, is loaded to the memory 11, and is executed by the CPU 10. Therefore, various functions as illustrated in FIG. 4 are realized. FIG. 4 illustrates a functional block diagram of the information processing device 1S. The information processing device 1S includes a connection management unit 101, a database (DB) processing unit 103, a DB 105, and a synchronization unit 107. The DB 105 is realized by the memory 11 or the HDD 14.

The connection management unit 101 executes a process of managing connection which is established between an information processing device in the information processing system 1I and an information processing device in the information processing system 2I. The DB processing unit 103 executes write in the DB 105, read from the DB 105, or the like. The synchronization unit 107 executes a process of fully synchronizing data stored in the DB 105 with data stored in a DB 105 of another information processing system.

Although FIG. 4 illustrates an example in which the connection management unit 101, the DB processing unit 103, the DB 105, and the synchronization unit 107 are realized in the information processing device 1S, the units may be realized in an information processing device other than the information processing device 1S. In addition, processing units corresponding to the connection management unit 101, the DB processing unit 103, the DB 105, and the synchronization unit 107 are realized in any one of information processing devices in the information processing system 2I.

In the information processing devices 1S to 3S and the information processing devices in the information processing system 2I, for example, the virtual machine of the user or a process of the user is executed, and connection is established between the information processing system 1I and the information processing system 2I for communication of the virtual machine or the process.

FIG. 5 illustrates an example of a system table stored in the DB 105. In the example of FIG. 5, a system number and a system name are stored. In the system table, an entry is provided for each information processing system. The DB 105 of each information processing system stores the same system table.

FIG. 6 illustrates an example of a first correspondence table stored in the DB 105. In the example of FIG. 6, an identifier (ID) of a network connector (hereinafter, referred to as a connector ID) which will be described later and an ID of a virtual router (virtual router will be described later) which is executed in the information processing system are stored. Since the virtual router ID is arbitrarily set in the information processing system, content of data stored in the DB 105 of each information processing systems is different.

Figure 7:
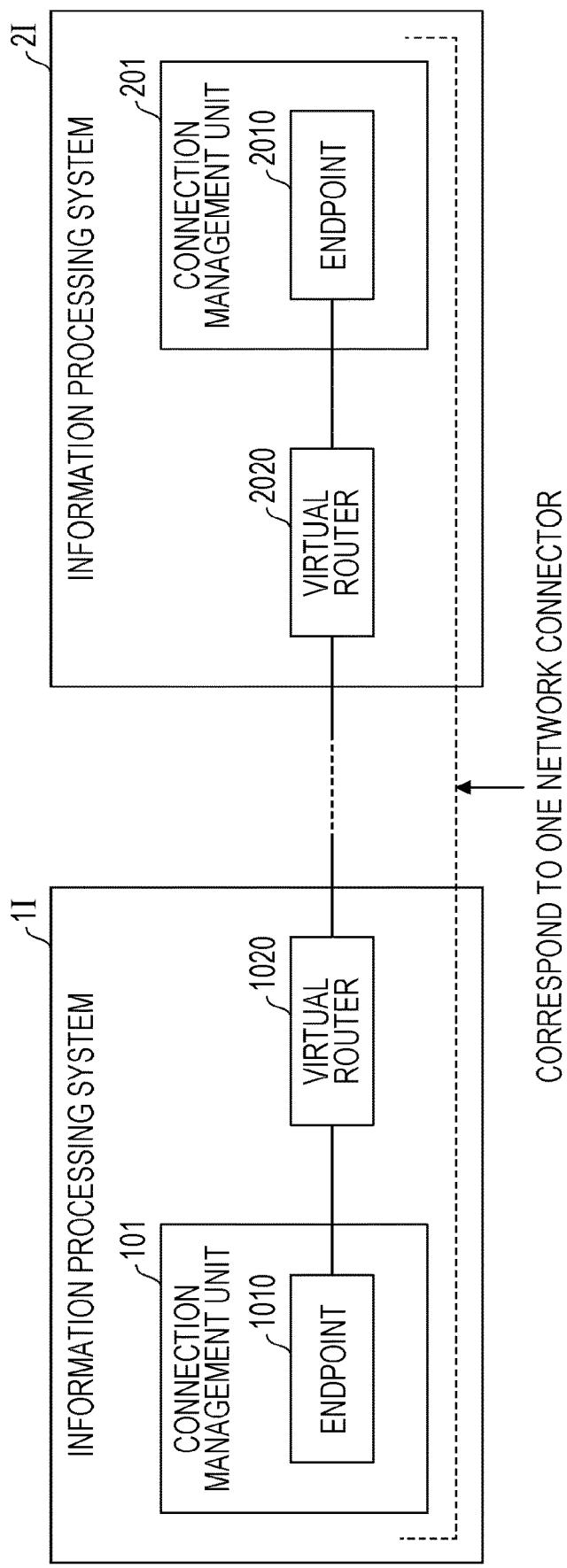
FIG. 7 is a diagram illustrating an example of connection, according to an embodiment.

Connection according to the embodiment will be described with reference to FIG. 7. The virtual machine or the process of the user uses an endpoint as a communication channel (for example, a virtual port), as illustrated in FIG. 7. In FIG. 7, an endpoint 1010 is generated in the connection management unit 101 of the information processing system 1I, and an endpoint 2010 is generated in a connection management unit 201 of the information processing system 2I. The endpoints 1010 and 2010 correspond to ends of connection, and are generated according to an API from the user terminal 1T. In addition, in a case where an operation starts, a virtual router 1020 is generated in the information processing system 1I, and the generated endpoint 1010 is virtually coupled to the virtual router 1020. In a case where the operation starts, a virtual router 2020 is generated in the information processing system 2I, and the generated endpoint 2010 is virtually coupled to the virtual router 2020. Therefore, one connection is generated between the endpoint 1010 and the endpoint 2010. In the embodiment, a unit of the connection is referred to as a network connector, and one virtual router and one endpoint in each information processing system correspond to one network connector.

Although the number of network connectors is 1 in FIG. 7, the number is not limited thereto.

Meanwhile, both the communication for synchronization of DBs and the communication between the endpoints are performed through the network 1N. However, in the embodiment, it is assumed that a case is generated where, due to a reason specific to communication for synchronization of DBs (for example, a problem of a load of the synchronization unit 107), only the communication stops.

Subsequently, a process which is executed in the information processing system 1I will be described with reference to FIGS. 8 to 34.

First, a process which is executed by the synchronization unit 107 will be described with reference to FIGS. 8 to 21. Here, a process which is executed by the synchronization unit 107 of the information processing system 1I will be described as an example.

Figure 8:
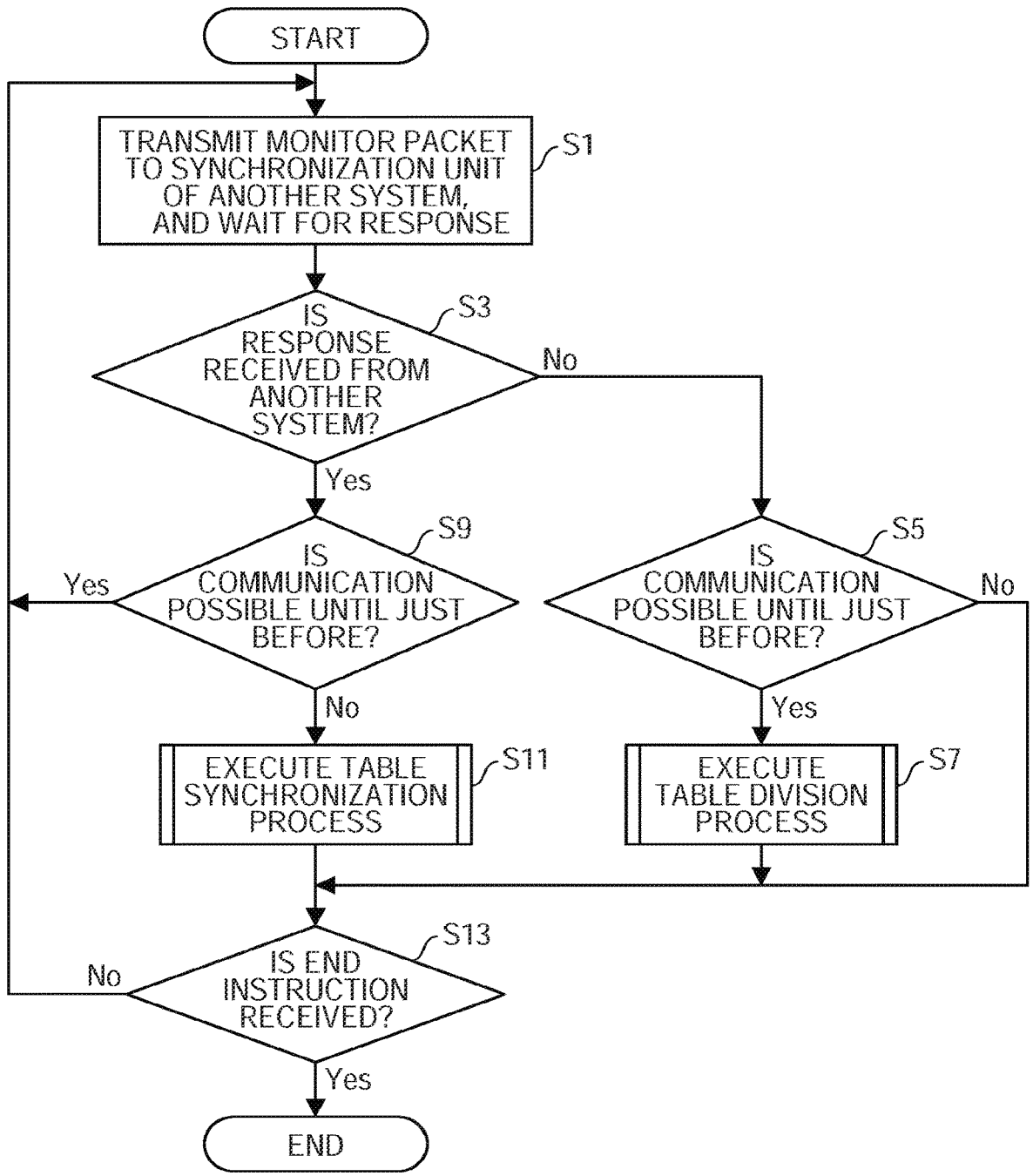
FIG. 8 is a diagram illustrating an example of an operational flowchart for a process performed by a synchronization unit, according to an embodiment.

The synchronization unit 107 of the information processing system 1I transmits a monitor packet to a synchronization unit of another information processing system (here, the information processing system 2I), and waits for a response (FIG. 8: step S1). In the embodiment, communication that is performed between the synchronization units in order to synchronize the DBs of the respective information processing systems is referred to as synchronized communication.

The synchronization unit 107 determines whether or not the response is received from another information processing system (step S3). That is, the synchronization unit 107 determines whether or not the synchronized communication is possible.

In a case where the response is received from another information processing system (step S3: Yes), the synchronization unit 107 determines whether or not the synchronized communication is possible until just before the response is received (step S9). That is, the synchronization unit 107 determines whether or not a state is converted from a state in which the synchronized communication is not possible into a state in which the synchronized communication is possible.

In a case where the synchronized communication is possible just before the response is received (step S9: Yes), the synchronization has been performed without problems, and the process returns to step S1. In contrast, in a case where the synchronized communication is not possible until just before the response is received (step S9: No), the synchronization has not been performed, and thus the synchronization unit 107 executes a table synchronization process (step S11). The table synchronization process will be described later. Furthermore, the process proceeds to step S13.

In contrast, in a case where the response is not received from another information processing system (step S3: No), the synchronization unit 107 determines whether or not the synchronized communication is possible until just before (step S5).

In a case where the synchronized communication is not possible even just before (step S5: No), the process proceeds to step S13. In contrast, in a case where the synchronized communication is possible until just before (step S5: Yes), the synchronization unit 107 executes a table division process (step S7). The table division process will be described later. Furthermore, the process proceeds to step S13.

The synchronization unit 107 determines whether or not an end instruction is received from a manager of the information processing system 1I (step S13). In a case where the end instruction is not received (step S13: No), the process returns to step S1. In contrast, in a case where the end instruction is received (step S13: Yes), the process ends.

When the above-described process is executed, synchronization or division is performed on a connector table at a timing in which a state of communication is changed.

Outlines of the table synchronization process and the table division process will be described with reference to FIGS. 9 to 14. The connector table is stored in the DB 105 as illustrated in FIG. 9, and data stored in the connector table is a target of the synchronization. The connector table stores records each including the fields: a connector ID which is an ID of a network connector, a dispensing flag which indicates whether or not the connector ID is dispensed, an identifier which is given to the network connector, a system number of an information processing system which dispenses the connector ID, and a system number of the information processing system which is allowed to use the connector ID are stored. The identifier, which is given to the network connector identifier, is uniquely generated between the information processing system 1I and the information processing system 2I. In the embodiment, an identifier, which includes the system name of the information processing system and the dispensed connector ID, is generated.

If the network connector is repeatedly generated and deleted in a certain information processing system, there is a possibility that communication is performed between endpoints of different users by reuse of the connection. However, in a case where the above-described identifier is used, the reuse of the connection is avoided, and thus security is improved. This will be described in detail later.

Figure 10:
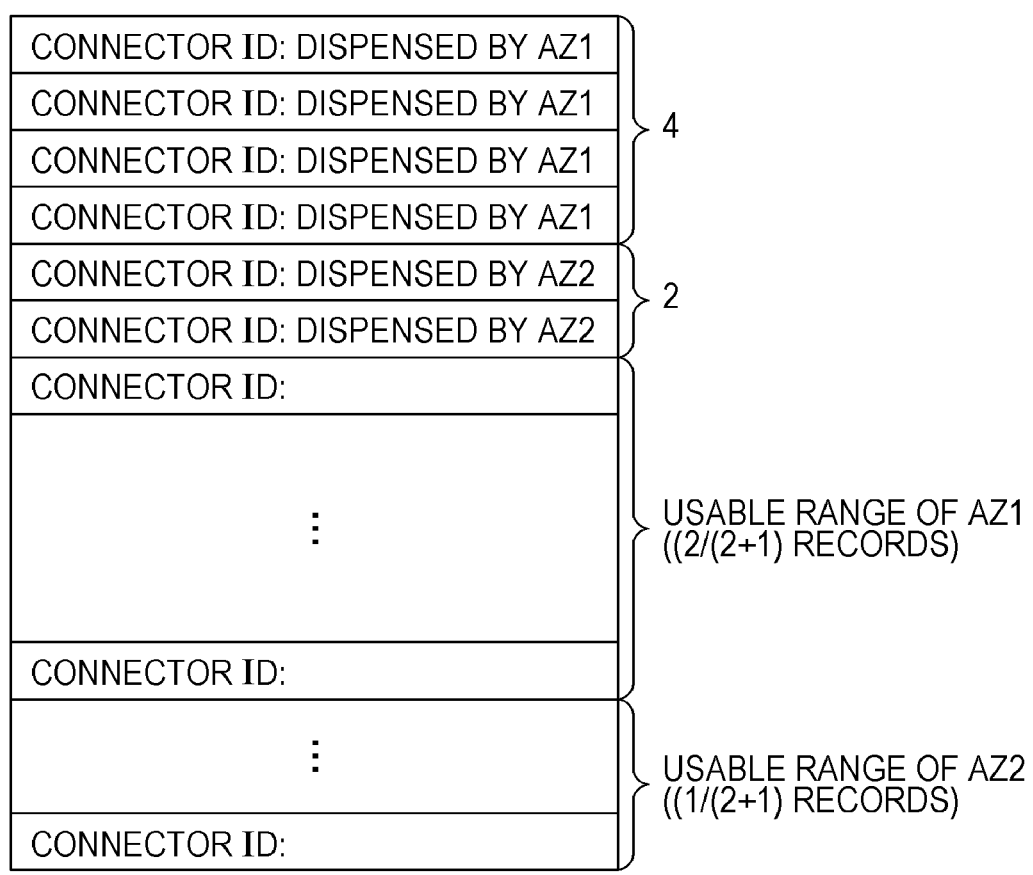
FIG. 10 is a diagram illustrating an example of a table synchronization process and a table division process, according to an embodiment.

In a case where a state is converted from the state in which the synchronized communication is possible into the state in which the synchronized communication is not possible, division is performed on records each including a non-dispensed connector ID, in the records of the connector table (FIG. 9) according to a ratio of the number of connector IDs dispensed by an information system to the number of all the dispensed connector IDs, and the records acquired through the division are assigned to the respective information processing systems so as to allow each of the information processing systems to generate network connectors independently by using the assigned records while the synchronized communication is not possible. For example, as illustrated in FIG. 10, in a case where four connector IDs are dispensed by an information processing system "AZ1" and two connector IDs are dispensed by an information processing system "AZ2", 4/(4+2)=2/(2+1) records of the non-dispensed records are assigned to the information processing system "AZ1" as a usable range for the information processing system "AZ1", and 2/(4+2)=1/(2+1) records of the non-dispensed records are assigned to the information processing system "AZ2" as a usable range for the information processing system "AZ2". As described above, a process of dividing a range of the non-dispensed connector IDs by a plurality of usable ranges corresponds to the table division process.

Figure 11:
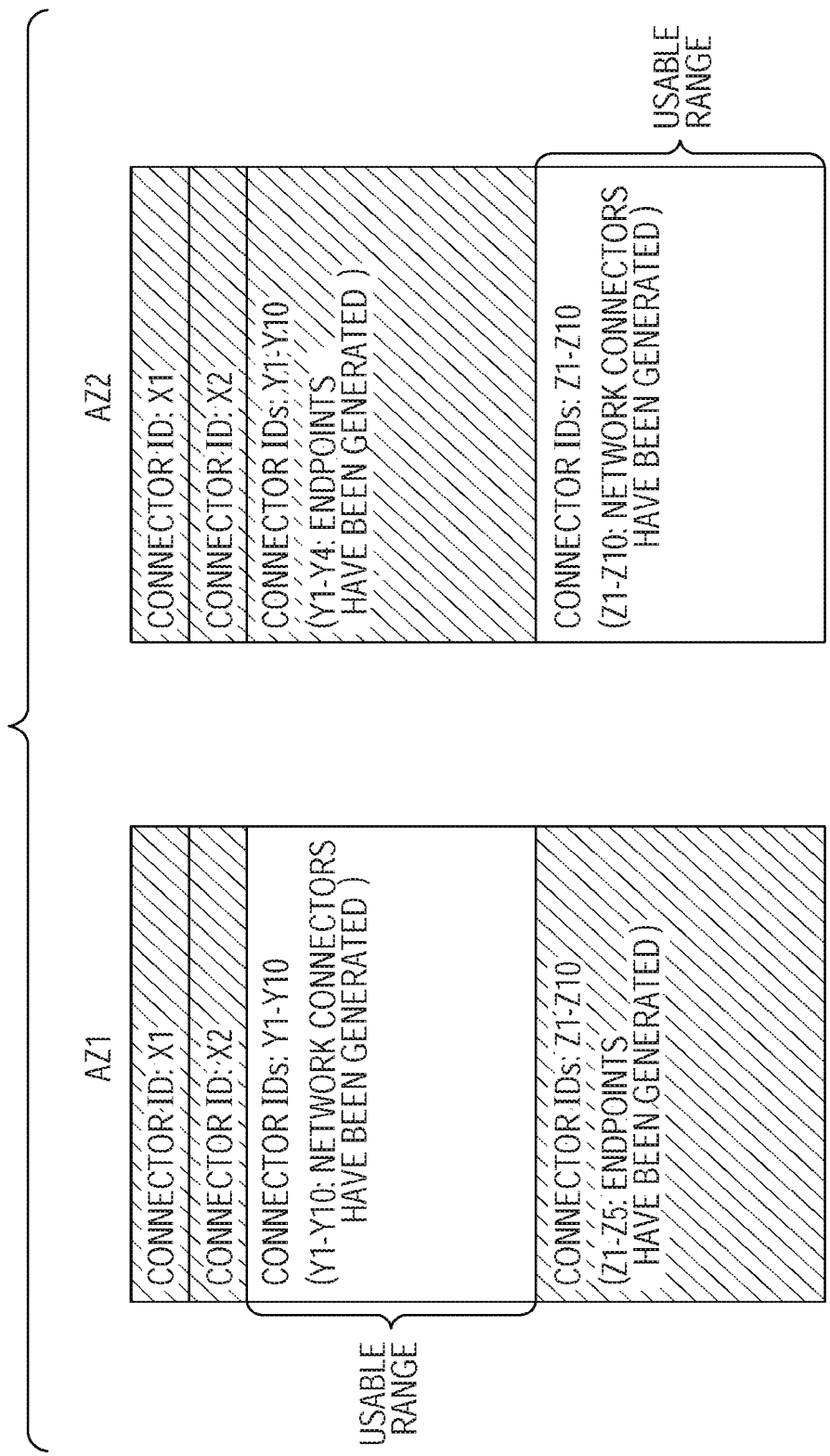
FIG. 11 is a diagram illustrating an example of a table synchronization process and a table division process, according to an embodiment.

Furthermore, in the table synchronization process after the synchronized communication is recovered, synchronization for the usable range of the information processing system (here, the information processing system 1I) and synchronization for the usable range of another information processing system (that is, the information processing system 2I) other than the information processing system 1I are executed in parallel. For example, as illustrated in FIG. 11, in a case where a connector ID "X1" is dispensed by the information processing system "AZ1" and a connector ID "X2" is dispensed by the information processing system "AZ2", records corresponding to connector IDs "Y1" to "Y10" are the usable range for the information processing system "AZ1", and records corresponding to connector IDs "Z1" to "Z10" are the usable range for the information processing system "AZ2". In FIG. 11, hatched parts indicate the ranges of the connector IDs which are not allowed to be dispensed by the corresponding information processing system. Here, it is assumed that the network connector is generated for the connector IDs "Y1" to "Y10" in advance by the information processing system "AZ1" and the network connector is generated for the connector IDs "Z1" to "Z10" in advance by the information processing system "AZ2". In a case where the network connectors are generated in advance, although the connector IDs are dispensed in the records of the connector table (FIG. 9), connections between the endpoints are not necessarily established.

Figure 12:
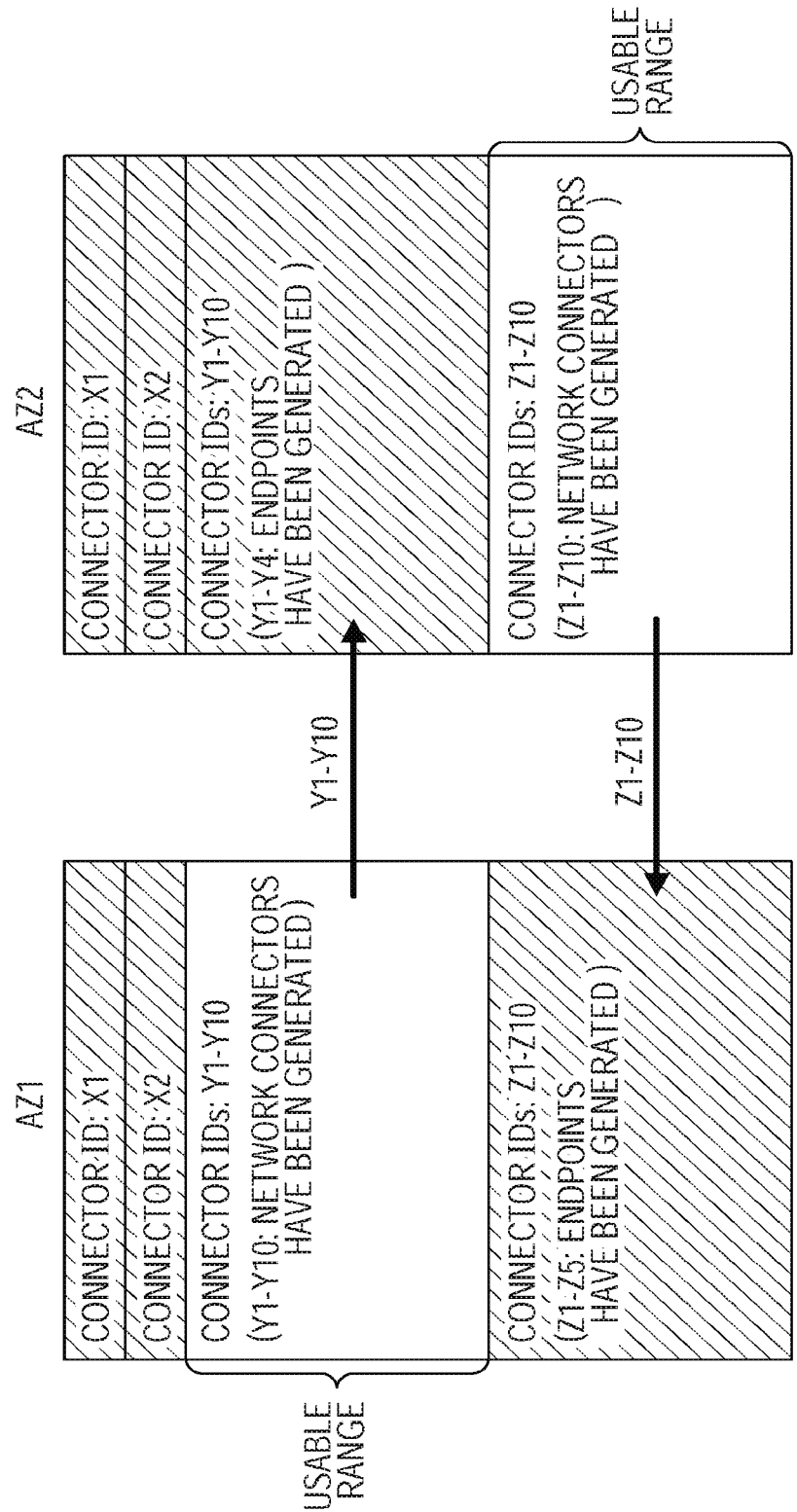
FIG. 12 is a diagram illustrating an example of a table synchronization process and a table division process, according to an embodiment.

As illustrated in FIG. 12, the information processing system "AZ1" notifies the connector IDs "Y1" to "Y10" for which the network connectors have been generated by the information processing system "AZ1", to the information processing system "AZ2". The information processing system "AZ2" notifies the connector IDs "Z1" to "Z10" for which the network connectors have been generated by the information processing system "AZ2", to the information processing system "AZ1". At this time, the information processing system "AZ1" has already generated endpoints for the connector IDs "Z1" to "Z5". The information processing system "AZ2" has already generated endpoints for the connector IDs "Y1" to "Y4" in advance. In a case where the endpoints have been already generated, communication is possible between the endpoints in which connection is established.

Figure 13:
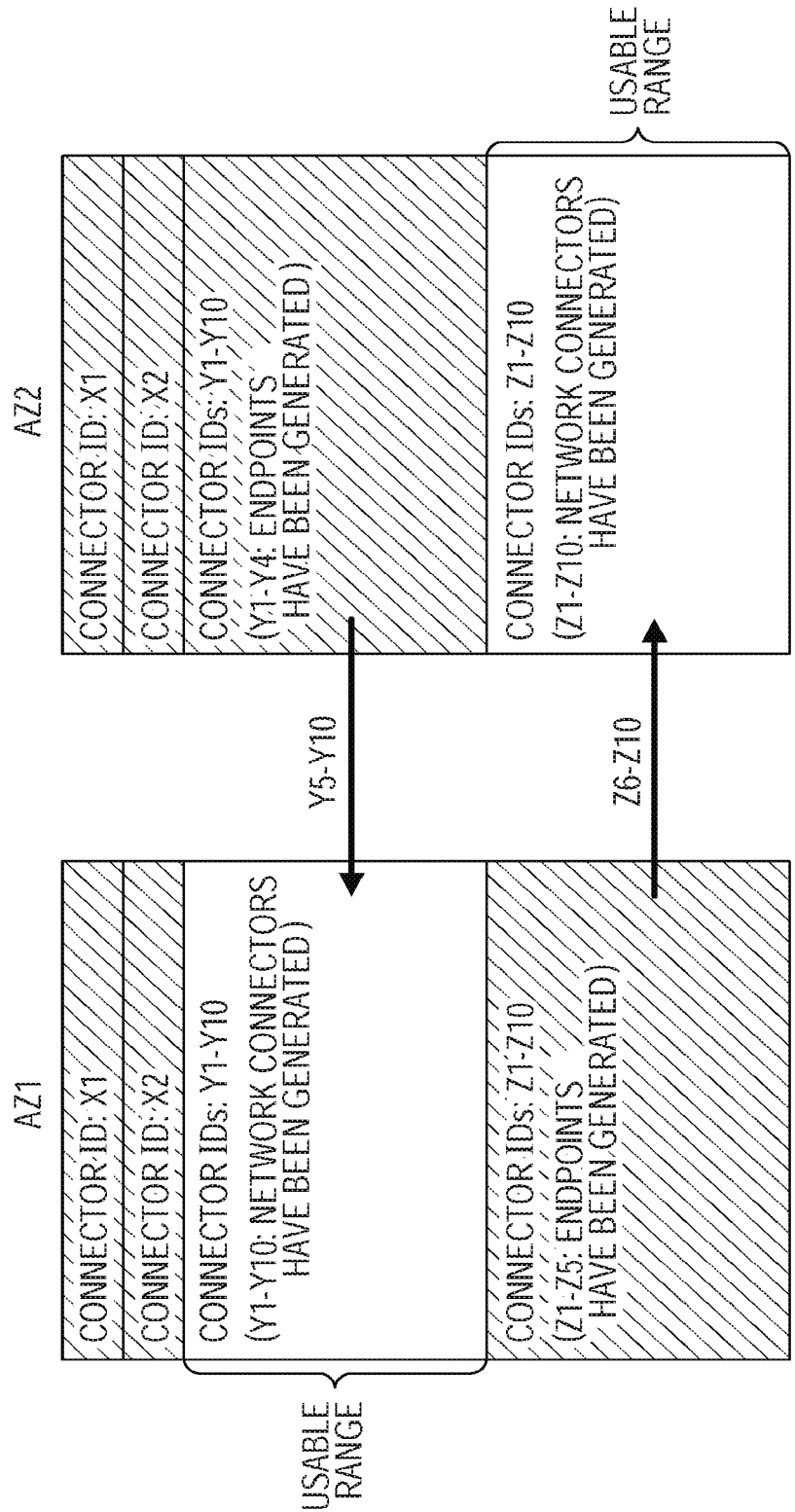
FIG. 13 is a diagram illustrating an example of a table synchronization process and a table division process, according to an embodiment.

As illustrated in FIG. 13, the information processing system "AZ1" notifies the connector IDs "Z6" to "Z10" for which endpoints have not been generated yet among the connector IDs notified by the information processing system "AZ2", to the information processing system "AZ2". In addition, the information processing system "AZ2" notifies the connector IDs "Y5" to "Y10" for which endpoints have not been generated yet among the connector IDs notified by the information processing system "AZ1", to the information processing system "AZ1". The connector IDs, which are notified in FIG. 13, correspond to connector IDs included in records for which synchronization is not completed. Therefore, the respective information processing systems are capable of grasping the records for which synchronization is not completed.

Figure 14:
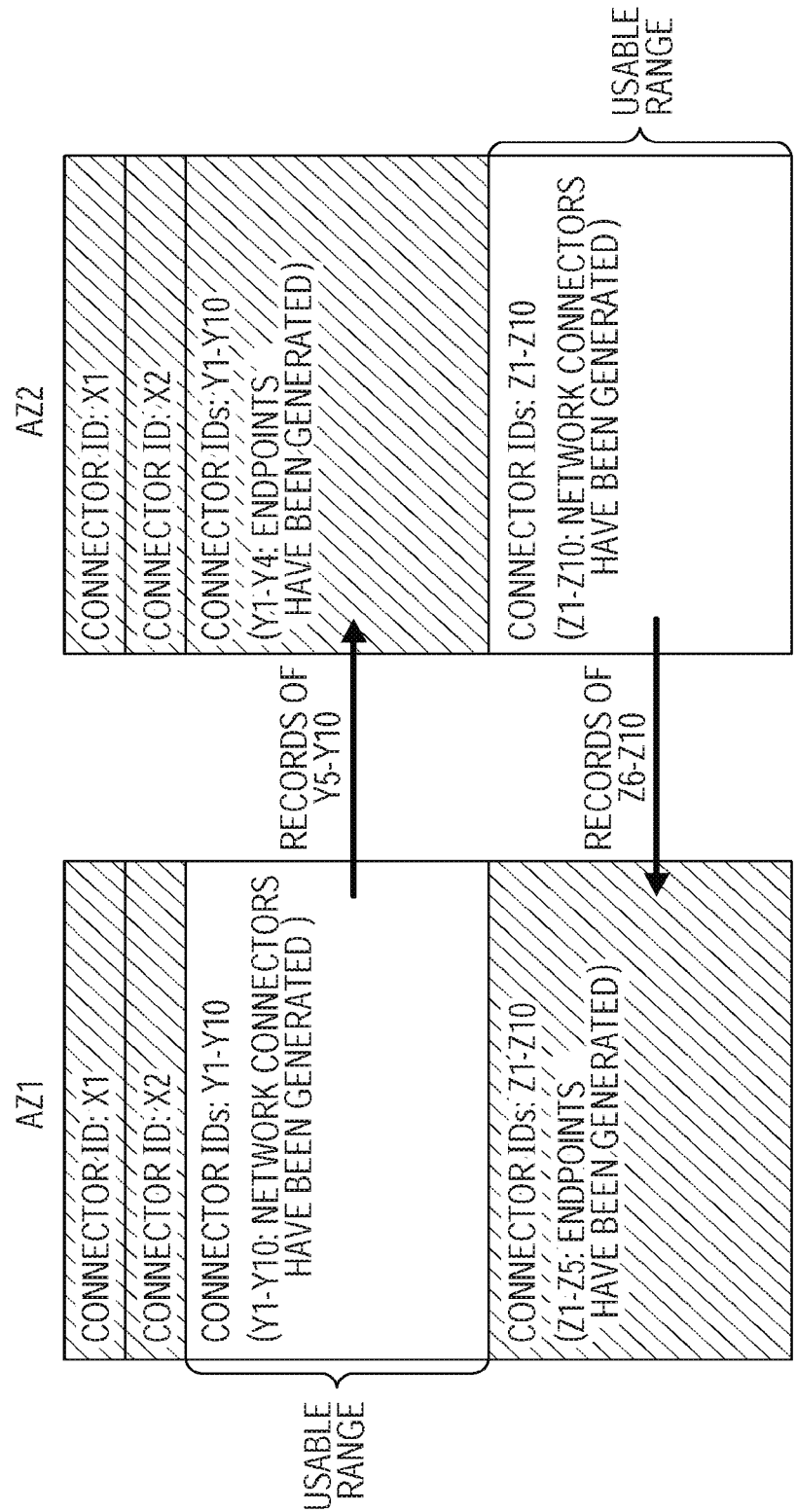
FIG. 14 is a diagram illustrating an example of a table synchronization process and a table division process, according to an embodiment.

As illustrated in FIG. 14, the information processing system "AZ1" transmits the records that include the connector IDs notified by the information processing system "AZ2", to the information processing system "AZ2". In addition, the information processing system "AZ2" transmits the records that include the connector IDs notified by the information processing system "AZ1", to the information processing system "AZ1". As a result, the synchronization on the connector table (FIG. 9) is completed.

Figure 15:
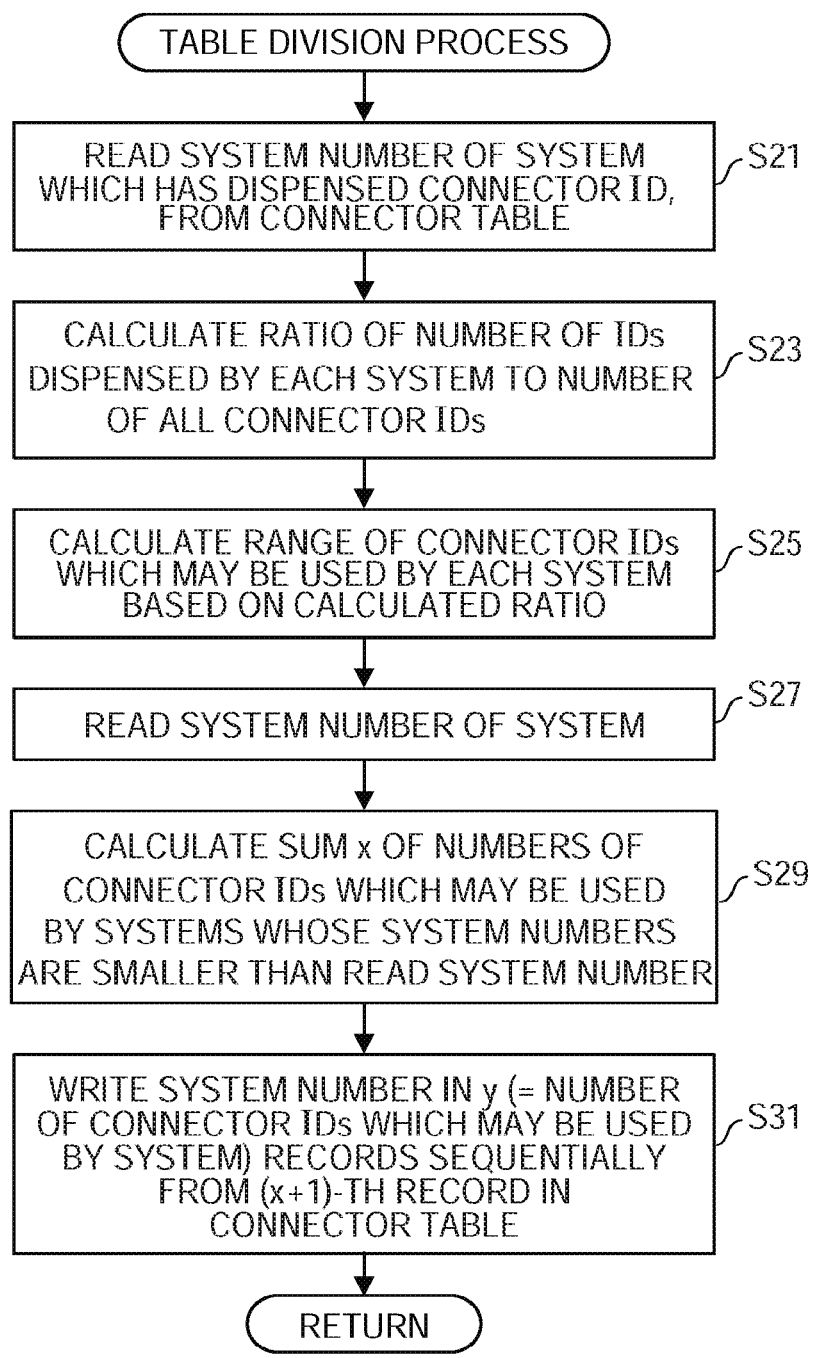
FIG. 15 is a diagram illustrating an example of an operational flowchart for a table division process, according to an embodiment.

The table division process will be described in more detail with reference to FIG. 15. First, the synchronization unit 107 reads the system number of the information processing system that has dispensed the connector ID, from the connector table (FIG. 9) (FIG. 15: step S21).

The synchronization unit 107 calculates a ratio of the number of connector IDs dispensed by the information processing system to the number of all the connector IDs which are stored in the connector table (FIG. 9), for each of the information processing systems (step S23). The process executed in step S23 is the same as being described with reference to FIG. 10. The number of all the connector IDs which are stored in the connector table (FIG. 9) may be set in advance by the manager of the information processing system 1I.

The synchronization unit 107 calculates the range of the connector IDs (that is, the usable range) which are allowed to be used by the respective information processing systems, based on the ratios calculated in step S23 (step S25). The process executed in step S25 is the same as being described with reference to FIG. 10.

The synchronization unit 107 reads the system number of the information processing system 1I from the system table (FIG. 5) (step S27).

The synchronization unit 107 calculates a sum x of the numbers of connector IDs which may be used by information processing systems whose system number is smaller than the system number read in step S27 (step S29). For example, in a case where the system number read in step S27 is 3, the sum x of the number of connector IDs which may be used by the information processing system having the system number "1", and the number of connector IDs which may be used by an information processing system having a system number "2", is calculated.

The synchronization unit 107 writes the system number of the information processing system 1I in y (y is the number of connector IDs which may be used by the information processing system 1I) records sequentially from an (x+1)-th record in the connector table (FIG. 9) (step S31). Thereafter, the process returns to a calling process.

The table synchronization process will be described in more detail with reference to FIGS. 16 to 21. As described above, in each of the information processing systems, the synchronization process for connector IDs in the usable range is executed in parallel with the synchronization process for connector IDs out of the usable range. First, the synchronization process for the connector IDs in the usable range (table synchronization process 1) will be described.

Figure 16:
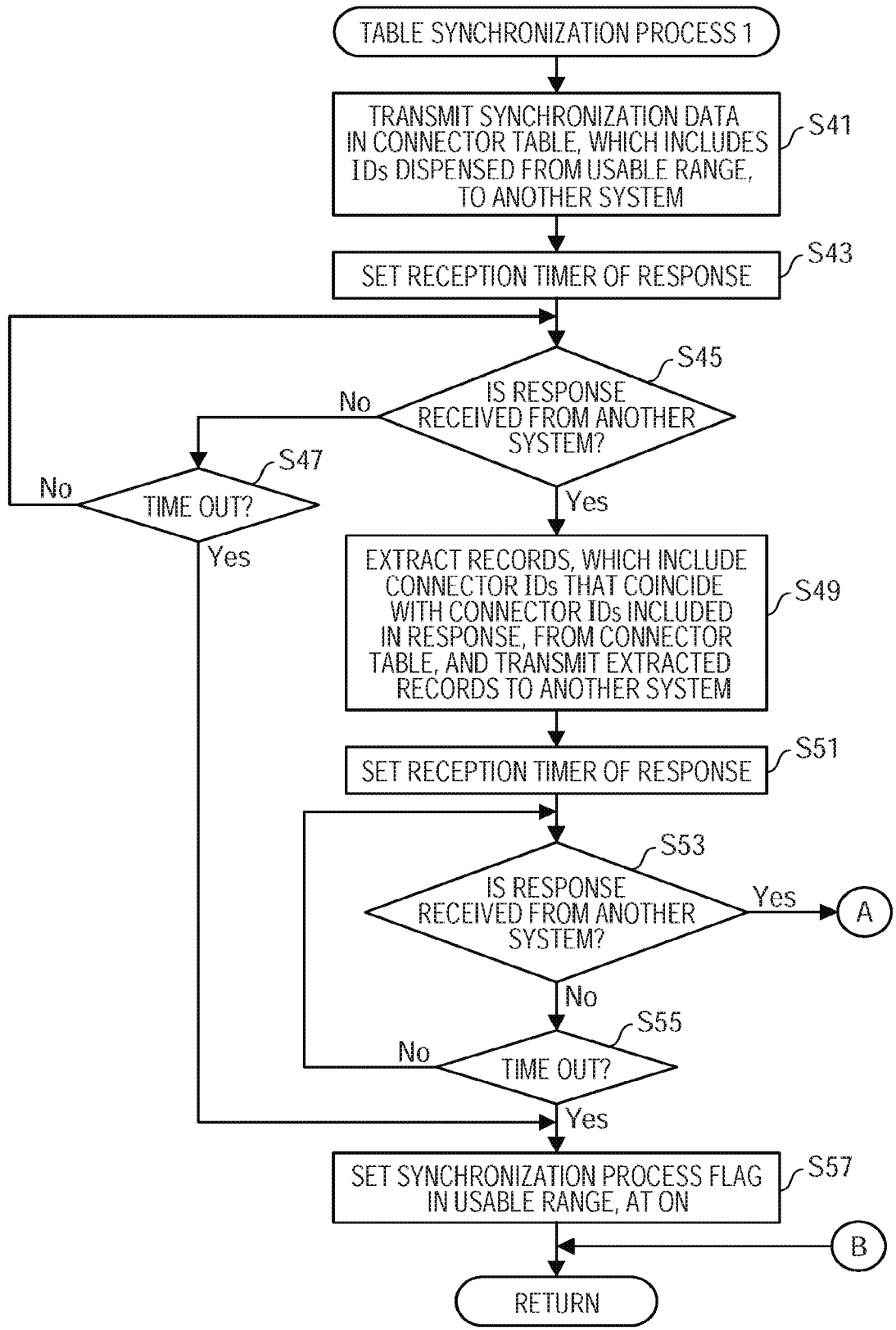
FIG. 16 is a diagram illustrating an example of an operational flowchart for a table synchronization process in a usable range, according to an embodiment.

The synchronization unit 107 transmits synchronization data in the connector table, which includes connector IDs (in this case, connector IDs for which the dispensing flag is set at "1") dispensed from the usable range of the information processing system 1I (FIG. 9), to another information processing system (in this case, the information processing system 2I) (FIG. 16: step S41).

The synchronization unit 107 sets a reception timer for a response to the synchronization data transmitted in step S41 (step S43).

The synchronization unit 107 determines whether or not the response is received from the information processing system 2I (step S45).

When the response is not received from the information processing system 2I (step S45: No), the synchronization unit 107 determines whether or not it is time out of the reception timer which is set in step S43 (step S47). When it is not the time out of the reception timer (step S47: No), the process returns to step S45. When it is the time out of the reception timer (step S47: Yes), the process proceeds to step S57.

In contrast, when the response is received from the information processing system 2I (step S45: Yes), the synchronization unit 107 extracts records including a connector ID that coincides with connector IDs included in the response, from the connector table (FIG. 9). Furthermore, the synchronization unit 107 transmits the extracted records to the information processing system 2I (step S49).

The synchronization unit 107 sets a reception timer for a response to the record which is transmitted in step S49 (step S51).

The synchronization unit 107 determines whether or not the response is received from the information processing system 2I (step S53).

When the response is received from the information processing system 2I (step S53: Yes), the process proceeds to step S61 of FIG. 17 through a terminal A. A process subsequent to the terminal A will be described later.

In contrast, when the response is not received from the information processing system 2I (step S53: No), the synchronization unit 107 determines whether or not it is the time out of the reception timer which is set in step S51 (step S55).

When it is not the time out of the reception timer (step S55: No), the process returns to step S53. When it is the time out of the reception timer (step S55: Yes), the synchronization unit 107 sets a synchronization process flag in the usable range at "ON" in the synchronization table stored in the DB 105 (step S57). Thereafter, the process returns to a calling process.

FIG. 18 illustrates an example of the synchronization table stored in the DB 105. In the example of FIG. 18, the synchronization process flag for connector IDs in the usable range, a synchronization success flag for connector IDs in the usable range, a synchronization process flag for connector IDs out of the usable range, and a synchronization success flag for connector IDs out of the usable range are stored. The synchronization process flag indicates whether or not the synchronization process is completed. When the synchronization process is completed, the synchronization process flag is set at "ON". The synchronization success flag indicates whether or not the synchronization is successful. When the synchronization is successful, the synchronization success flag is set at "ON". Hereinafter, "a flag for connector IDs in the usable range" and "a flag for connector IDs out of the usable range" are abbreviated as "a flag in the usable range" and "a flag out of the usable range", respectively.

FIG. 19 illustrates a combination of a value of the synchronization success flag in the usable range and a value of the synchronization success flag out of the usable range. (1) When the synchronization success flag in the usable range is "ON" and the synchronization success flag out of the usable range is "ON", the synchronization is completely successful, and thus information which is stored in a field "system capable of using ID" in the connector table is deleted. (2) When the synchronization success flag in the usable range is "OFF" and the synchronization success flag out of the usable range is "ON", the synchronization fails as a whole, and thus records for connector IDs out of the usable range is rolled back to a state before the synchronization process starts. (3) When the synchronization success flag in the usable range is "ON" and the synchronization success flag out of the usable range is "OFF", the synchronization fails as a whole, and thus the synchronization process ends without executing an updating process on the records in the connector table. (4) When the synchronization success flag in the usable range is "OFF" and the synchronization success flag out of the usable range is "OFF", the synchronization fails, and thus the synchronization process ends without executing the updating process on the records in the connector table.

Figure 17:
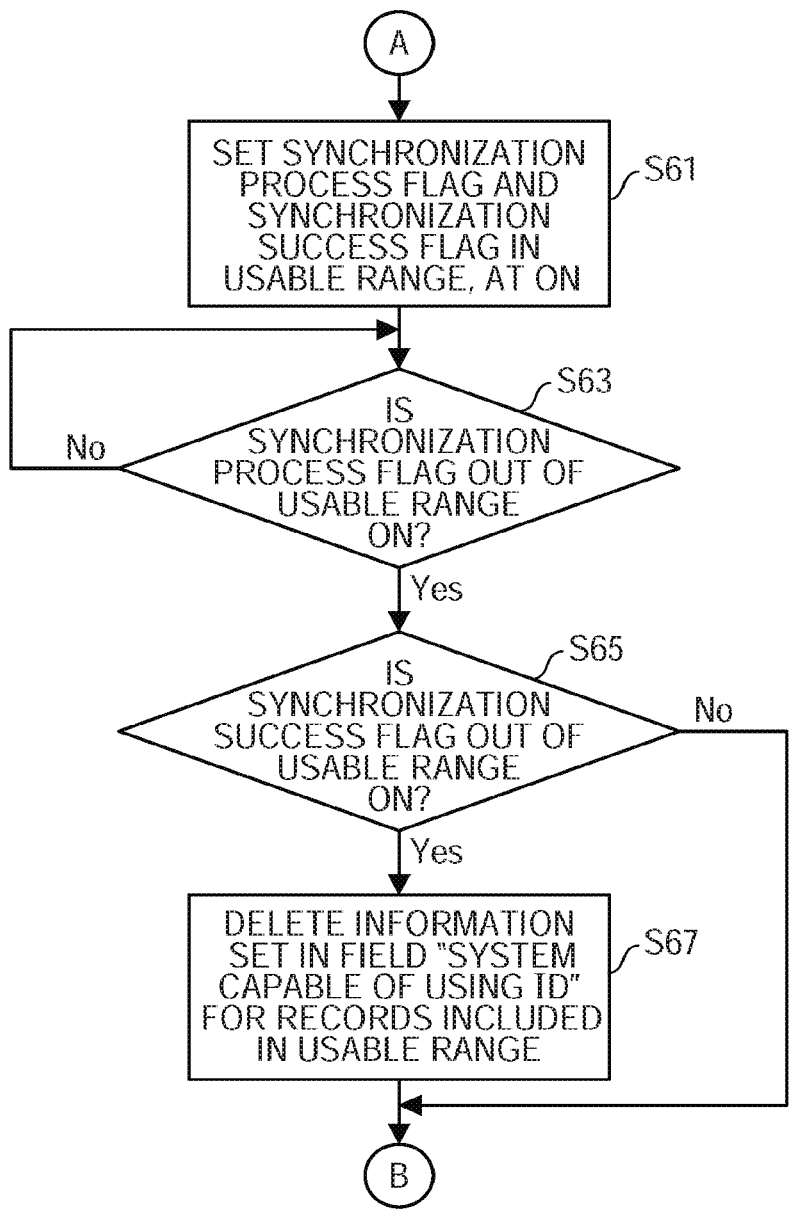
FIG. 17 is a diagram illustrating an example of an operational flowchart for a table synchronization process in a usable range, according to an embodiment.

Proceeding to description of FIG. 17, the synchronization unit 107 sets the synchronization process flag and the synchronization success flag in the usable range at "ON" (FIG. 17: step S61).

The synchronization unit 107 determines whether or not the synchronization process flag out of the usable range is "ON" (step S63). When the synchronization process flag out of the usable range is not "ON" (step S63: No), the synchronization process for connectors out of the usable range is not completed, and thus the process returns to step S63.

When the synchronization process flag for connectors out of the usable range is "ON" (step S63: Yes), the synchronization unit 107 determines whether or not the synchronization success flag out of the usable range is "ON" (step S65). When the synchronization success flag out of the usable range is not "ON" (step S65: No), the process proceeds to FIG. 16 through a terminal B, and the process returns to a calling process.

When the synchronization success flag out of the usable range is "ON" (step S65: Yes), the synchronization unit 107 deletes information set in the field "system capable of using ID" for the records included in the usable range (step S67). Thereafter, the process returns to FIG. 16 through the terminal B, and the process returns to a calling process.

A synchronization process (table synchronization process 2) for connector IDs out of the usable range will be described with reference to FIGS. 20 and 21.

Figure 20:
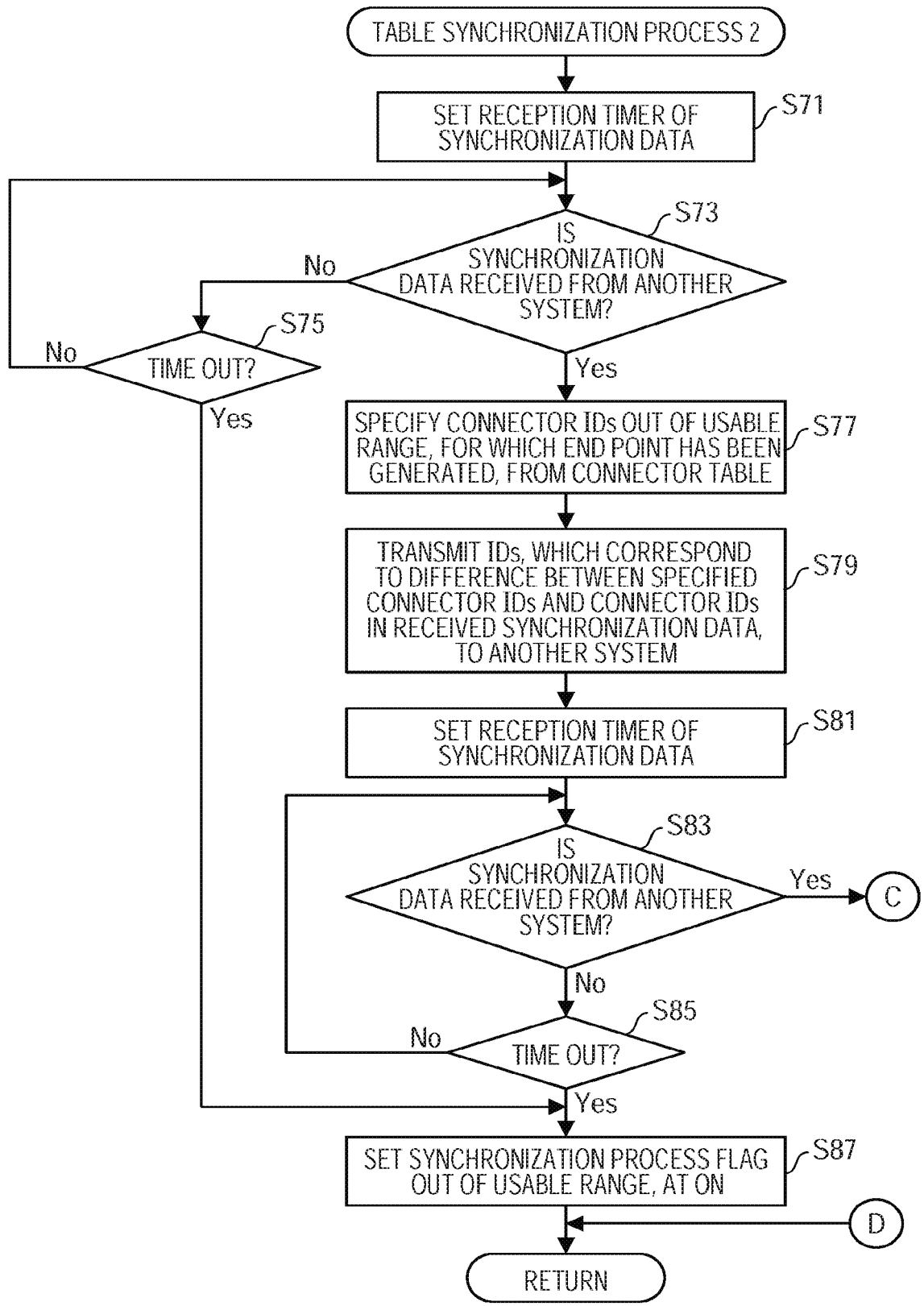
FIG. 20 is a diagram illustrating an example of an operational flowchart for a table synchronization process out of a usable range, according to an embodiment.

The synchronization unit 107 sets a reception timer for the synchronization data (FIG. 20: step S71).

The synchronization unit 107 determines whether or not the synchronization data is received from another information processing system (here, the information processing system 2I) (step S73).

When the synchronization data is not received from the information processing system 2I (step S73: No), the synchronization unit 107 determines whether or not it is the time out of the reception timer which is set in step S71 (step S75). When it is not the time out of the reception timer (step S75: No), the process returns to step S73. When it is the time out of the reception timer (step S75: Yes), the process proceeds to step S87.

In contrast, when the synchronization data is received from the information processing system 2I (step S73: Yes), the synchronization unit 107 specifies a connector ID out of the usable range, for which an endpoint has been generated, from the connector table (FIG. 9) (step S77). An identifier of the connector ID, for which the endpoint has been generated, is registered in the connector table (FIG. 9).

The synchronization unit 107 transmits connector IDs, which correspond to a difference between the connector IDs specified in step S77 and connector IDs in the received synchronization data, to the information processing system 2I (step S79).

The synchronization unit 107 sets a reception timer for the synchronization data for the connector IDs transmitted in step S79 (step S81).

The synchronization unit 107 determines whether or not the synchronization data is received from the information processing system 2I (step S83).

When the synchronization data is received from the information processing system 2I (step S83: Yes), the process proceeds to step S89 of FIG. 21 through a terminal C. A process subsequent to the terminal C will be described later.

In contrast, when the synchronization data is not received from the information processing system 2I (step S83: No), the synchronization unit 107 determines whether or not it is time out of the reception timer which is set in step S81 (step S85).

When it is not the time out of the reception timer (step S85: No), the process returns to step S83. When it is time out of the reception timer (step S85: Yes), the synchronization unit 107 sets the synchronization process flag out of the usable range at "ON" in the synchronization table (FIG. 18) stored in the DB 105 (step S87). Thereafter, the process returns to a calling process.

Figure 21:
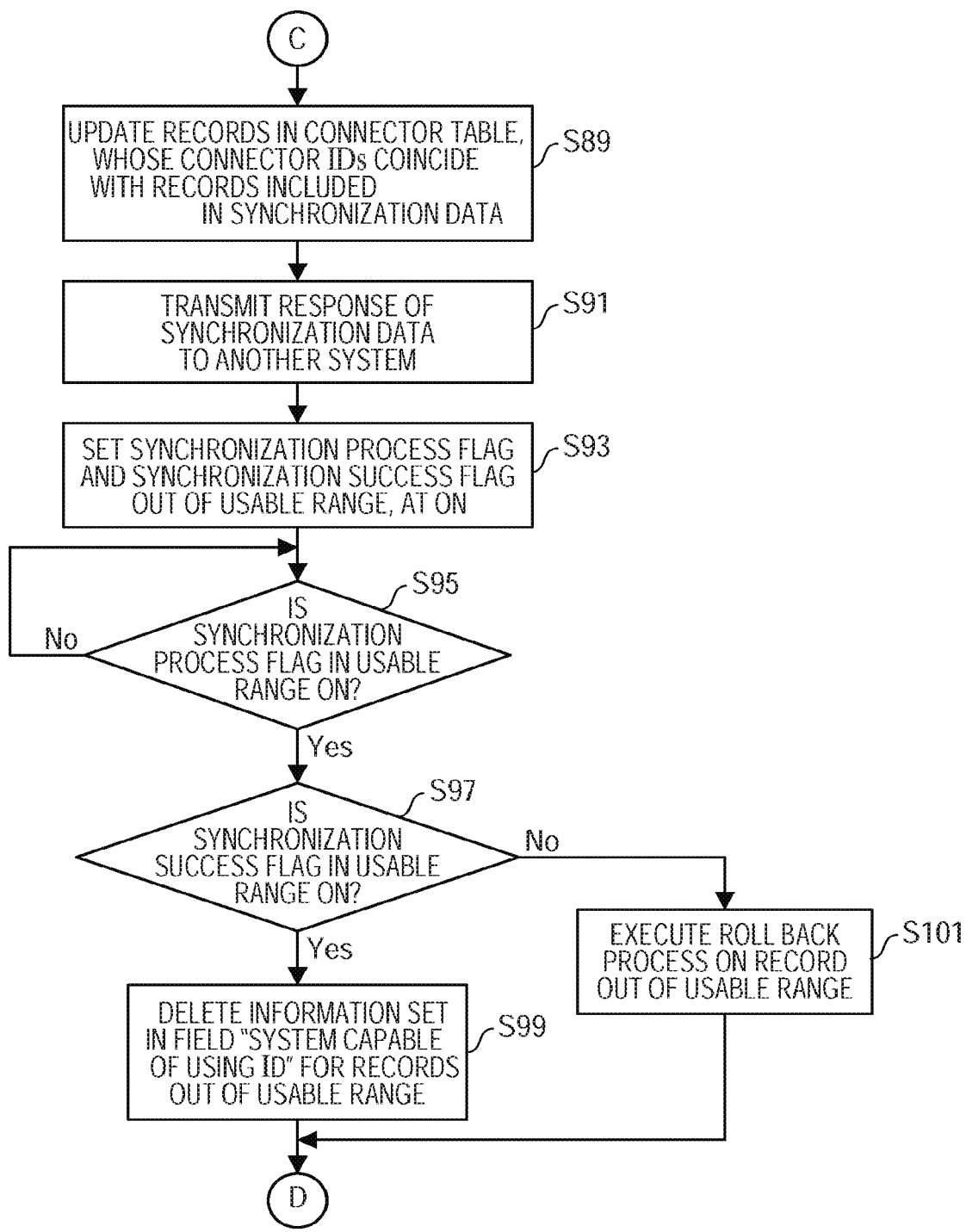
FIG. 21 is a diagram illustrating an example of an operational flowchart for a table synchronization process out of a usable range, according to an embodiment.

Proceeding to description of FIG. 21, the synchronization unit 107 updates records in the connector table, whose connector IDs coincide with records included in the received synchronization data (FIG. 21: step S89).

The synchronization unit 107 transmits a response to the received synchronization data to the information processing system 2I (step S91).

The synchronization unit 107 sets both the synchronization process flag out of the usable range and the synchronization success flag at "ON" (step S93).

The synchronization unit 107 determines whether or not the synchronization process flag in the usable range is "ON" (step S95). When the synchronization process flag in the usable range is not "ON" (step S95: No), the synchronization process in the usable range is not completed, and thus the process returns to step S95.

When the synchronization process flag in the usable range is "ON" (step S95: Yes), the synchronization unit 107 determines whether or not the synchronization success flag in the usable range is "ON" (step S97). When the synchronization success flag in the usable range is not "ON" (step S97: No), the roll back process, which is a process returning to the process before the synchronization process starts, is executed on the records out of the usable range (step S101).

When the synchronization success flag in the usable range is "ON" (step S97: Yes), the synchronization unit 107 deletes information set in the field "system capable of using ID" for the records out of the usable range (step S99). Thereafter, the process returns to FIG. 20 through a terminal D, and the process returns to a calling process.

As described above, division is performed on the range of the connector IDs and the synchronization unit of each of the information processing systems grasps the usable range of each of the information processing systems. Therefore, it is possible to execute synchronization of records in the usable range in parallel with synchronization of records out of the usable range without contradiction.

Subsequently, the process executed when the network connector is generated and the process executed when the endpoint is generated will be described with reference to FIGS. 22 to 31.

Figures 22, 23:
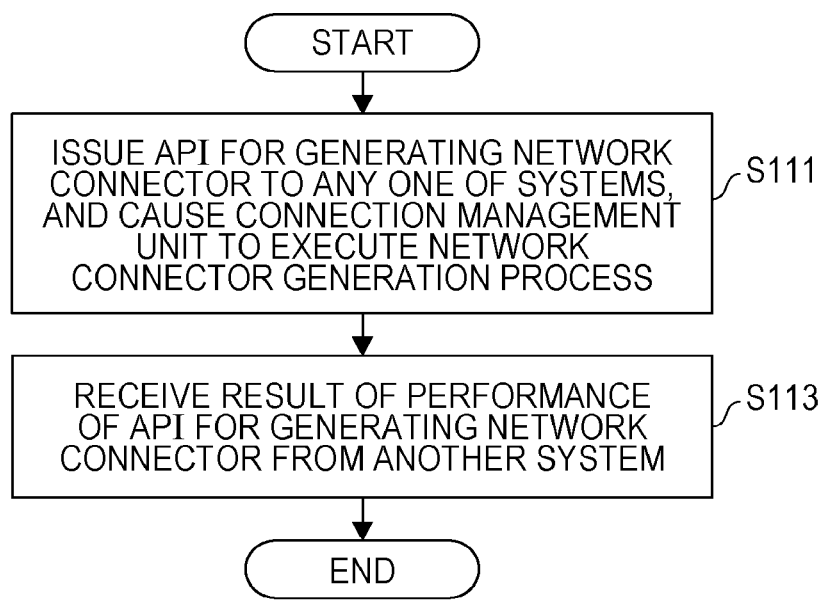
FIG. 22 is a diagram illustrating an example of an operational flowchart for a process performed by a user terminal in a case where a network connector is generated, according to an embodiment.
FIG. 23 is a diagram illustrating an example of information included in an execution result of an API for generating a network connector, according to an embodiment.

First, the process, which is executed by the user terminal 1T when the network connector is generated, will be described with reference to FIG. 22. The user terminal 1T issues an API for generating a network connector to any one of information processing systems according to an instruction from the user, and causes the connection management unit 101 of the information processing system to execute a network connector generation process (FIG. 22: step S111). Here, it is assumed that the API is issued to the information processing system 1I. The network connector generation process will be described later.

The user terminal 1T receives an execution result of the API for generating the network connector from the information processing system 2I (step S113). The user terminal 1T stores the received execution result in a storage device such as a memory. Thereafter, the process ends.

FIG. 23 illustrates an example of information included in the execution result. The example of FIG. 23 includes a connector ID, an identifier which is given to a network connector, and a system name of a system which dispenses the connector ID. The execution result is used later in an endpoint generation process.

Figure 24:
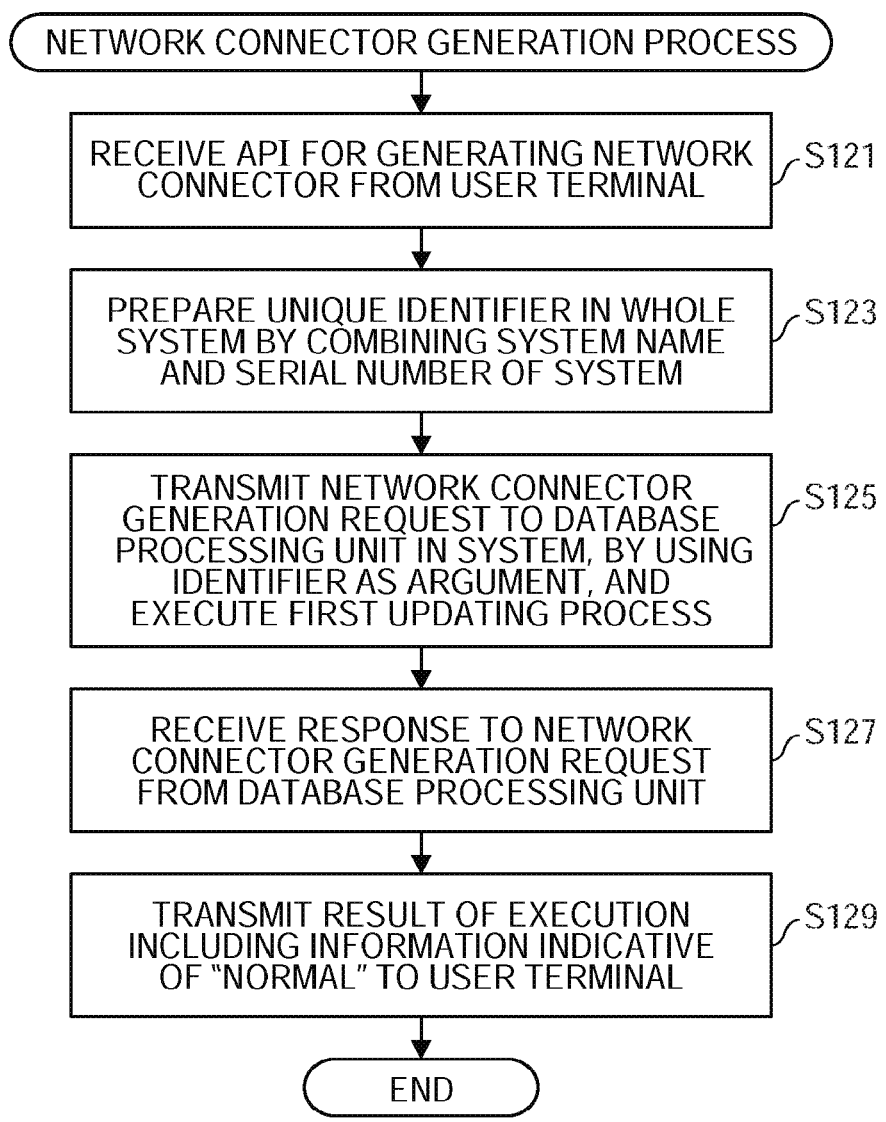
FIG. 24 is a diagram illustrating an example of an operational flowchart for a network connector generation process, according to an embodiment.
Figure 25:
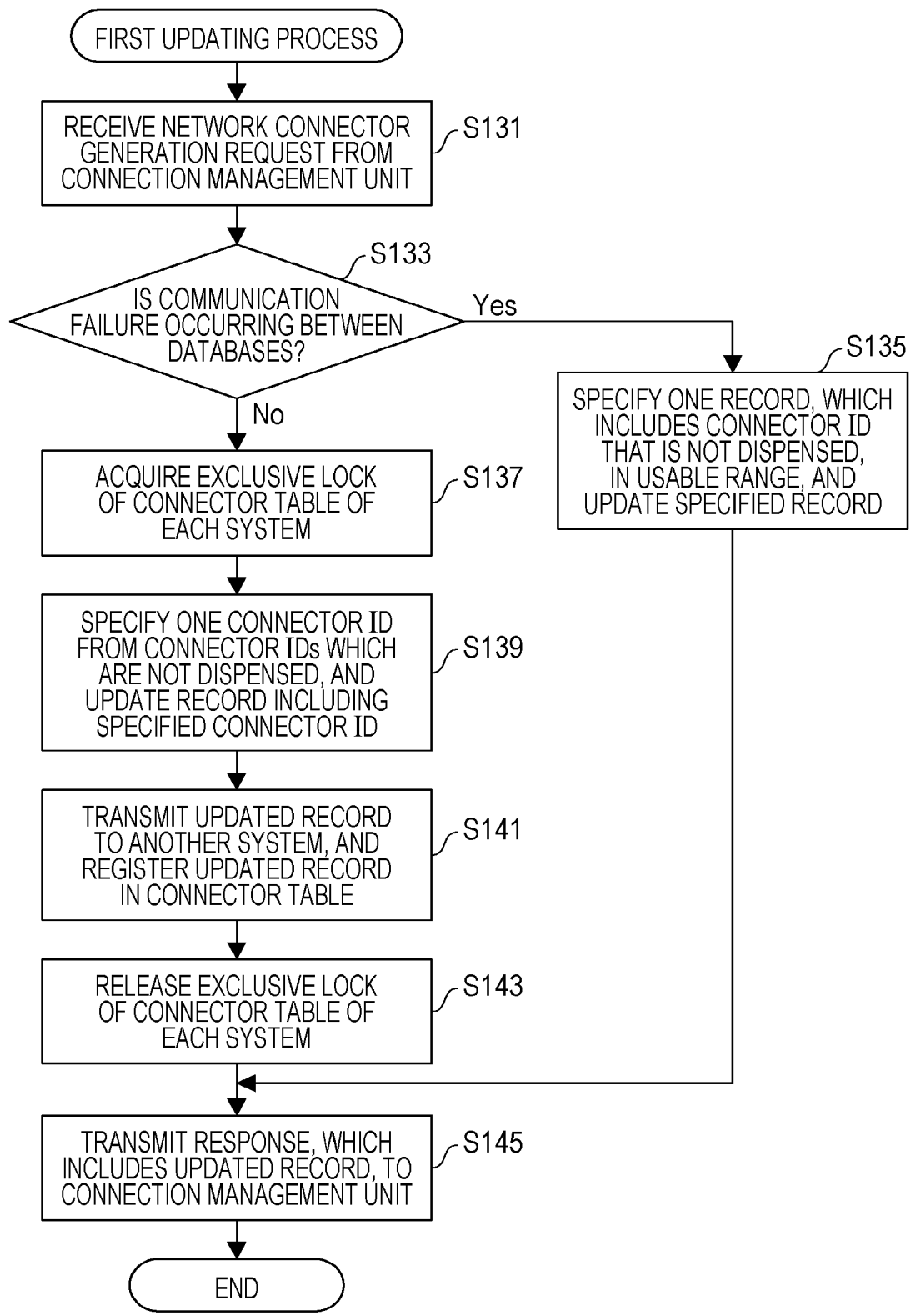
FIG. 25 is a diagram illustrating an example of an operational flowchart for a first updating process, according to an embodiment.

The network connector generation process will be described with reference to FIGS. 24 and 25. First, the connection management unit 101 receives the API for generating the network connector from the user terminal 1T (FIG. 24: step S121).

The connection management unit 101 generates a unique identifier in the whole information processing system by combining the system name of the information processing system 1I and a serial number for the connector ID (step S123). For example, an identifier is generated by connecting the system name of the information processing system 1I to the serial number for the connector ID. Here, the serial number is a number incremented whenever the connector ID is generated in the information processing system 1I.

The connection management unit 101 transmits a request to generate a network connector, which includes the identifier generated in step S123 as an argument, to the DB processing unit 103 in the information processing system 1I, and causes the DB processing unit 103 to execute a first updating process (step S125).

Here, the first updating process will be described. First, the DB processing unit 103 receives the request to generate the network connector from the connection management unit 101 (FIG. 25: step S131).

The DB processing unit 103 determines whether or not communication failure is occurring between the DBs (step S133). In a case where communication failure is occurring between the DBs (step S133: Yes), the DB processing unit 103 causes the synchronization unit 107 to execute a process below. For example, the synchronization unit 107 specifies one record, which includes a connector ID that is not dispensed in the usable range, from the connector table (FIG. 9), and updates the specified record (step S135). Thereafter, the process proceeds to step S145.

In step S135, a dispensing flag of the specified record is set at "1", the identifier which is included in the request to generate the network connector is registered, and the system number of the information processing system 1I as the system which dispenses the connector ID is registered.

In contrast, in a case where the communication failure is not occurring between the DBs (step S133: No), the DB processing unit 103 causes the synchronization unit 107 to execute a process below. For example, the synchronization unit 107 executes a process of acquiring an exclusive lock of the connector tables (FIG. 9) of the respective information processing systems (step S137). In step S137, communication is performed between the synchronization units of the respective information processing systems.

The synchronization unit 107 specifies one record, which includes a connector ID that is not dispensed, from the connector table (FIG. 9), and updates the specified record (step S139). In step S139, the dispensing flag of specified record is set at "1", the identifier, which is included in the request to generate the network connector, is registered, and the system number of the information processing system 1I as the system which dispenses the connector ID is registered. The field "system capable of using ID" is set at NULL.

The synchronization unit 107 transmits the record updated in step S139 to another information processing system (here, the information processing system 2I), so that the updated record is registered in the connector table of the information processing system 2I (step S141).

The synchronization unit 107 executes a process of releasing the exclusive lock of the connector tables (FIG. 9) of the respective information processing systems (step S143). In step S143, communication is performed between the synchronization units of the respective information processing systems.

The synchronization unit 107 provides a notification that updating is completed to the DB processing unit 103. In response, the DB processing unit 103 transmits a response which includes the updated record to the connection management unit 101 (step S145). Thereafter, the process ends.

Returning to description with reference to FIG. 24, the connection management unit 101 receives the response to the request to generate the network connector from the DB processing unit 103 (step S127).

The connection management unit 101 transmits an execution result including information (in the embodiment, the connector ID, the identifier, and the system number), which indicates that the network connector is normally generated, to the user terminal 1T (step S129). Thereafter, the process ends.

When the process as described above is executed, the generation of the network connector, which is a process corresponding to a step before the endpoint is generated and communication actually starts, is appropriately completed. In addition, for example, even if the network connector is generated while communication failure is occurring, a unique identifier is given to the network connector between the information processing system 1I and the information processing system 2I, and an occurrence of reuse of the network connector may be avoided.

Figure 26:
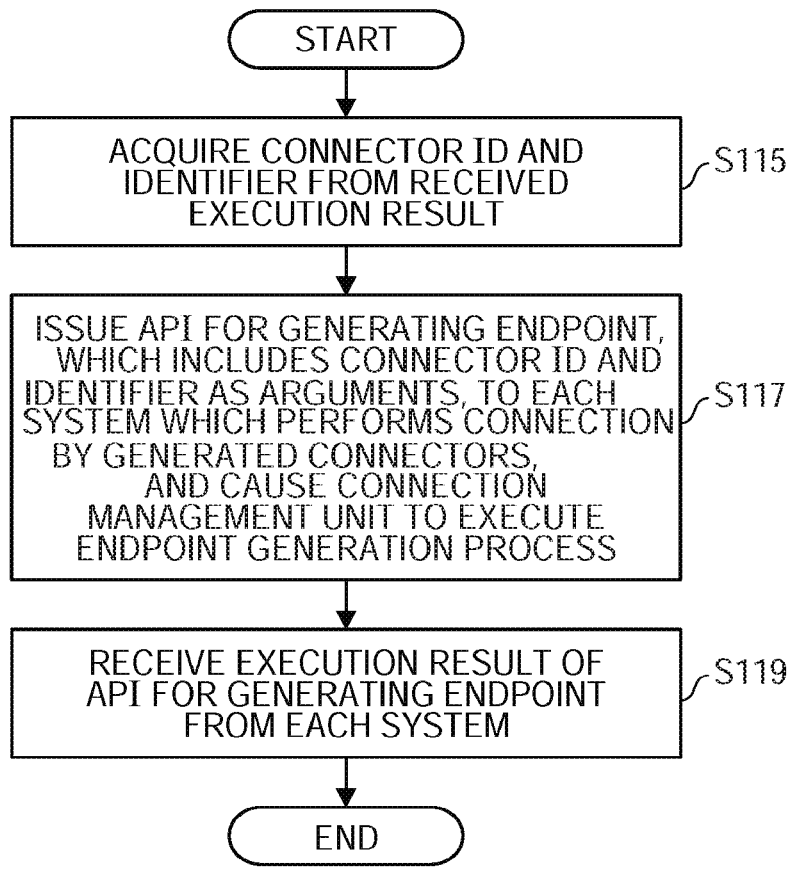
FIG. 26 is a diagram illustrating an example of an operational flowchart for a process performed by a user terminal in a case where an endpoint is generated, according to an embodiment.

Subsequently, a process executed by the user terminal 1T in a case where the endpoint is generated will be described. The user terminal 1T acquires the connector ID and the identifier from the execution result of the API for generating the network connector (FIG. 26: step S115).

The user terminal 1T issues the API for generating the endpoint, which includes the connector ID and the identifier included in the execution result as arguments, to the respective information processing systems (here, the information processing systems 1I and 2I) which perform connection by the generated network connectors, and causes the connection management unit 101 to execute the endpoint generation process (step S117).

Figure 27:
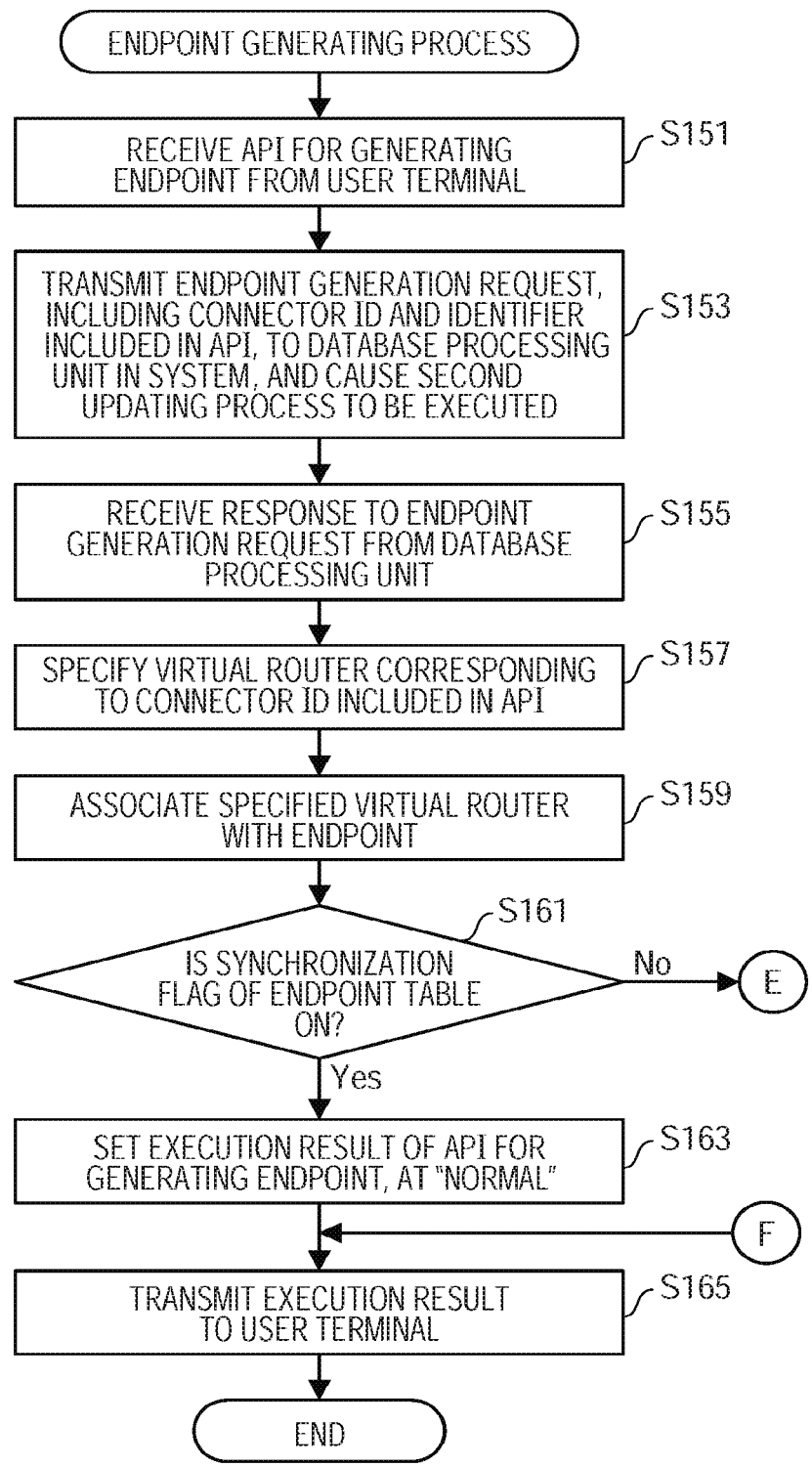
FIG. 27 is a diagram illustrating an example of an operational flowchart for an endpoint generation process, according to an embodiment.

The endpoint generation process will be described with reference to FIG. 27. First, the connection management unit 101 receives the API for generating the endpoint from the user terminal 1T (FIG. 27: step S151).

The connection management unit 101 transmits a request to generate the endpoint, which includes the connector ID and the identifier included in the API as the arguments, to the DB processing unit 103 in the information processing system 1I, and causes the DB processing unit 103 to execute a second updating process (step S153).

Figure 28:
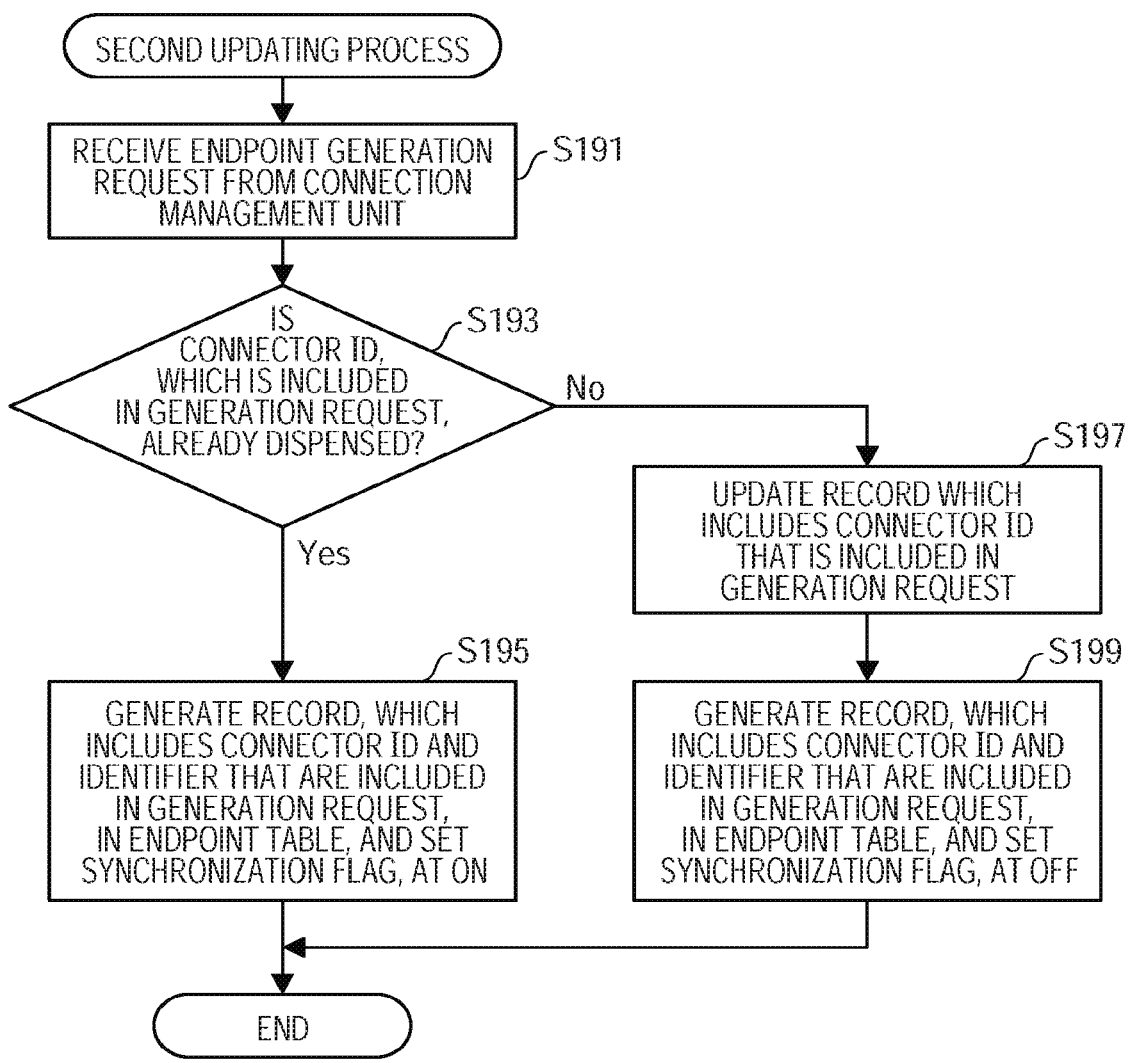
FIG. 28 is a diagram illustrating an example of an operational flowchart for a second updating process, according to an embodiment.

The second updating process will be described with reference to FIG. 28. The DB processing unit 103 receives the request to generate the endpoint from the connection management unit 101 (FIG. 28: step S191).

The DB processing unit 103 determines whether or not the connector ID included in the generation request has been already dispensed, based on the connector table (step S193). The connector ID, which has been already dispensed, has a dispensing flag which is set at "1" in the connector table.

In a case where the connector ID included in the generation request has been already dispensed (step S193: Yes), the DB processing unit 103 generates a record, which includes the connector ID and the identifier included in the generation request, in an endpoint table. Furthermore, the DB processing unit 103 sets the synchronization flag at "ON" (step S195), and transmits a response to the request to generate the endpoint, to the connection management unit 101. Thereafter, the process ends.

FIG. 29 illustrates an example of the endpoint table. In the example of FIG. 29, an endpoint ID, a connector ID, an identifier, and a synchronization flag are stored. The synchronization flag indicates a state of communication between the DBs when an endpoint is generated, and the synchronization flag is set at "OFF" when a failure occurs in communication between the DBs. The record of the endpoint table is different from that of the connector table (FIG. 9), and is deleted or added while an operation is being performed.

On the other hand, when the connector ID included in the generation request has not been dispensed yet (step S193: No), the DB processing unit 103 specifies a record which includes the connector ID included in the generation request, and updates the specified record (step S197). In step S197, the dispensing flag of the specified record is set at "1", the identifier included in the request to generate the endpoint is registered, and the system number of the information processing system 1I is registered as the system which dispenses the connector ID. In a case where a failure is occurring in communication between the DBs, the record of the connector table is not updated, and thus the record is updated by the process in step S197.

The DB processing unit 103 generates the record which includes the connector ID and the identifier included in the generation request in the endpoint table (FIG. 29). Furthermore, the DB processing unit 103 sets the synchronization flag at "OFF" (step S199), and transmits the response to the request to generate the endpoint, to the connection management unit 101. Thereafter, the process ends.

Returning to description of FIG. 27, the connection management unit 101 receives the response to the request to generate the endpoint, from the DB processing unit 103 (step S155).

The connection management unit 101 specifies a virtual router corresponding to the connector ID included in the API for generating the endpoint from the first correspondence table (FIG. 6) (step S157).

The connection management unit 101 associates an ID of the virtual router specified in step S157 with an ID of the generated endpoint, and stores the virtual router ID and the endpoint ID in a second correspondence table (step S159).

FIG. 30 illustrates an example of data stored in the second correspondence table. In FIG. 30, the endpoint ID and the virtual router ID corresponding to the endpoint are stored.

The connection management unit 101 determines whether or not a synchronization flag of the endpoint table (FIG. 29) is set at "ON" for the generated endpoint (step S161).

When the synchronization flag of the endpoint table (FIG. 29) is not set at "ON" for the generated endpoint (step S161: No), the process proceeds to step S167 of FIG. 31 through a terminal E.

Figure 31:
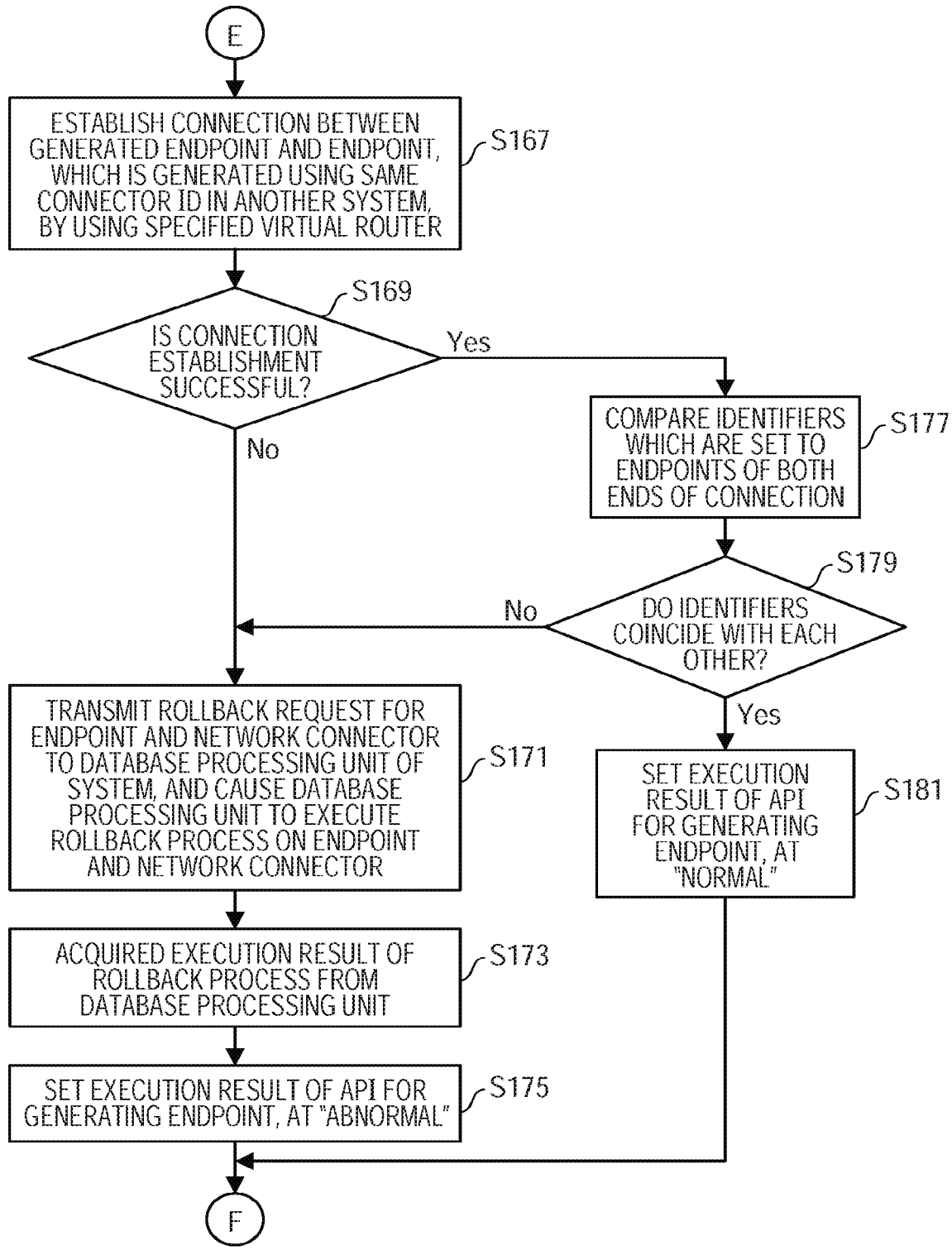
FIG. 31 is a diagram illustrating an example of an operational flowchart for an endpoint generation process, according to an embodiment.

Proceeding to description with reference to FIG. 31, the connection management unit 101 outputs a connection establishment instruction to the generated endpoint. The endpoint, which receives the establishment instruction, executes a process of establishing connection between the endpoint and an endpoint, which is generated using the same connector ID in the information processing system 2I, using the virtual router specified in step S157 (step S167 of FIG. 31). As illustrated in FIG. 7, when one connection is established between endpoints through the virtual routers, communication is possible between the endpoints.

The connection management unit 101 determines whether or not the connection establishment is successful (step S169).

When the connection establishment is successful (step S169: Yes), the connection management unit 101 extracts identifiers from a packet which is transmitted and received when the connection is established, and compares the identifiers which are set to the endpoints of both ends of the connection (step S177). In this way, verification of the network connector is checked.

When the identifiers, which are set to the endpoints of both ends of the connection, do not coincide with each other (step S179: No), the process proceeds to step S171. When the identifiers, which are set to the endpoints of both ends of the connection, coincide with each other (step S179: Yes), the connection management unit 101 sets the execution result of the API for generating the endpoint at "normal" (step S181). The process returns to step S165 of FIG. 27 through a terminal F.

In contrast, when the connection establishment fails (step S169: No), the connection management unit 101 transmits a roll back request for the endpoints and the network connector, to the DB processing unit 103 of the information processing system 1I, and causes the DB processing unit 103 to execute the roll back process on the endpoints and the network connector (step S171). An endpoint roll back indicates, for example, deletion of the records for the endpoints, and a network connector roll back indicates, for example, deletion of the record for the network connector.

The connection management unit 101 acquires an execution result of the roll back process from the DB processing unit 103 (step S173).

The connection management unit 101 sets the execution result of the API for generating the endpoint at "abnormal" (step S175). The process returns to step S165 of FIG. 27 through a terminal F.

Returning to description with reference to FIG. 27, when the synchronization flag of the endpoint table (FIG. 29) is set at "ON" for the generated endpoint (step S161: Yes), the connection management unit 101 sets the execution result of the API for generating the endpoint at "normal" (step S163).

The connection management unit 101 transmits the execution result of the API for generating the endpoint to the user terminal 1T (step S165). Thereafter, the process ends.

Returning to description of FIG. 26, the user terminal 1T receives the execution result of the API for generating endpoint from each of the information processing systems (step S119). Thereafter, the process ends.

In a case where the above-described process is executed, it is possible to start communication between the endpoints while the reuse of the network connector is not generated even when communication between the DBs stops.

Figure 32:
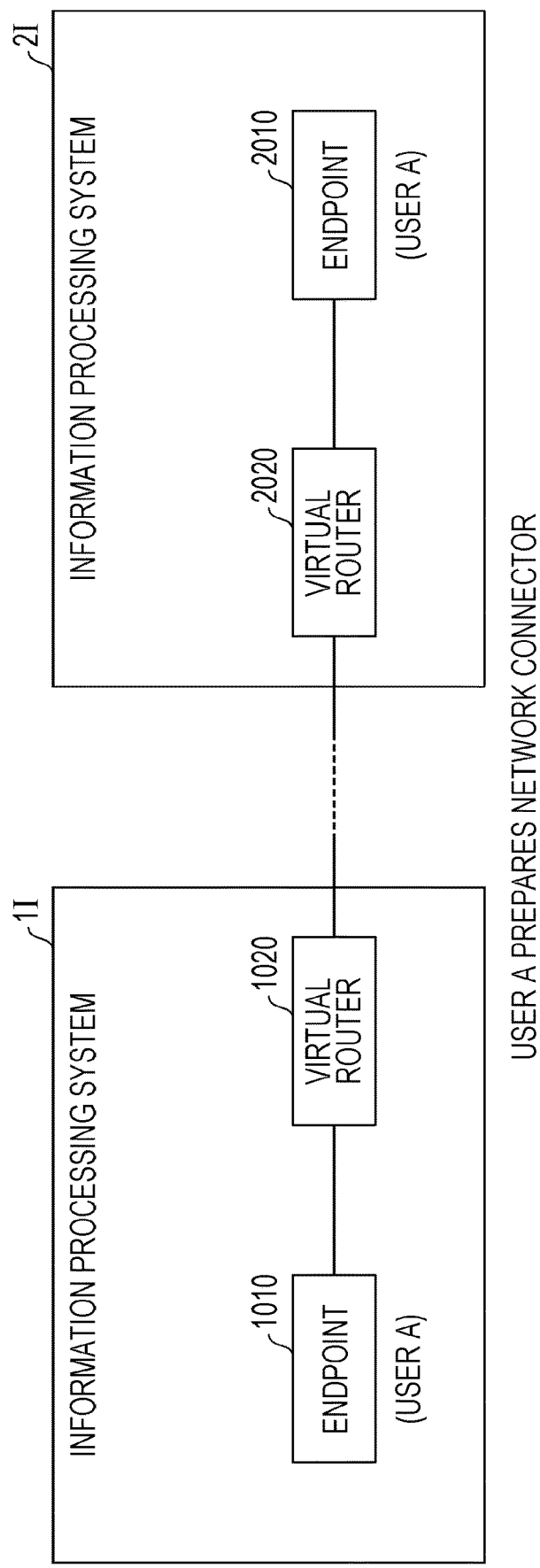
FIG. 32 is a diagram illustrating an example of reuse of a network connector.

The reuse of the network connectors will be described with reference to FIGS. 32 to 34. In FIG. 32, connection is established between the endpoint 1010 for a user A and the endpoint 2010 for the user A. It is assumed that, in this state, all the connector IDs which are registered in the connector table are dispensed. Although another connection may be also established, another connection is omitted in FIG. 32 in order to simplify the description.

Figure 33:
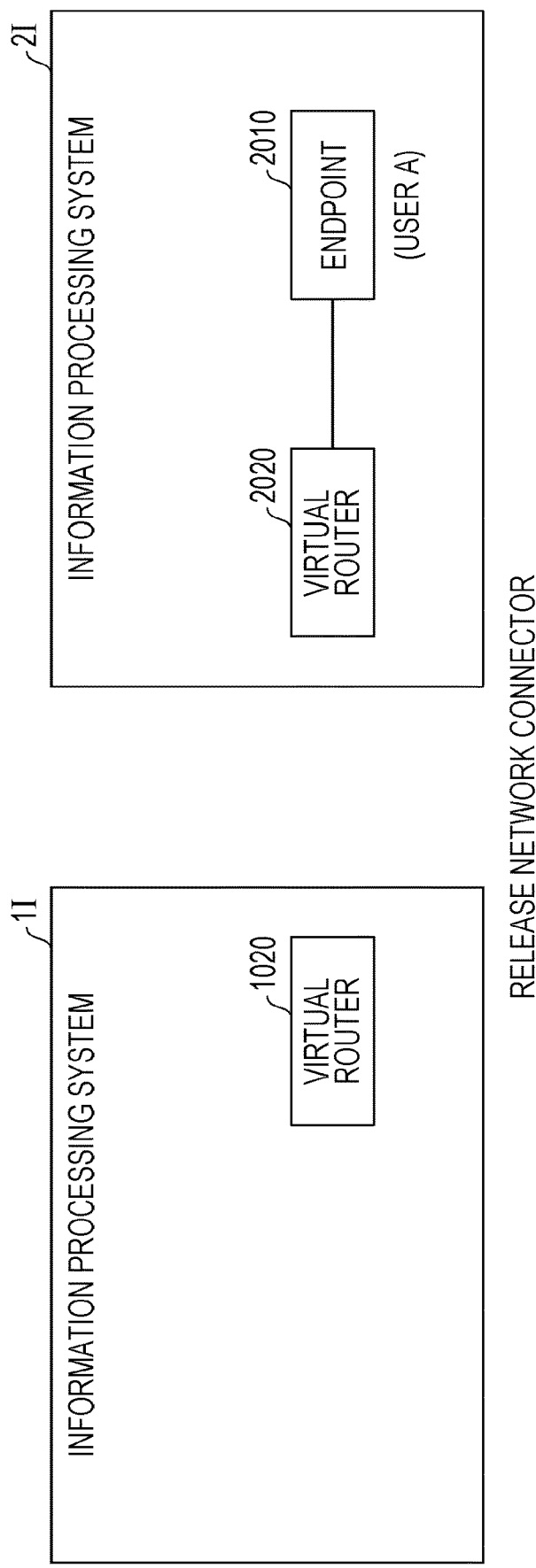
FIG. 33 is a diagram illustrating an example of reuse of a network connector.

Furthermore, it is assumed that the endpoint 1010 is deleted from the terminal of the user A by the API while the synchronized communication stops, as illustrated in FIG. 33. In this case, in the connector table of the information processing system 1I, a record for the connection between the endpoint 1010 and the endpoint 2010 is deleted. Although a communication path is vanished because the endpoint 1010 is deleted, the virtual router 1020 remains without being deleted.

Figure 34:
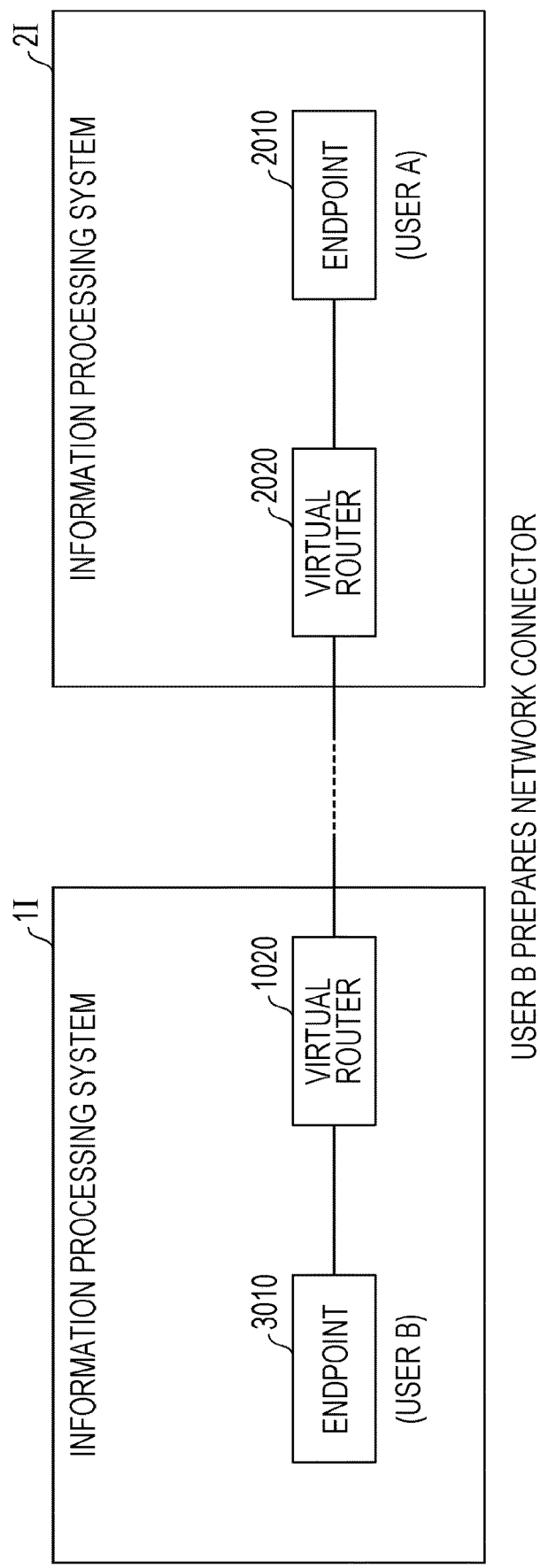
FIG. 34 is a diagram illustrating an example of reuse of a network connector.

Furthermore, as illustrated in FIG. 34, it is assumed that the connector ID included in the deleted record is dispensed again from a terminal of a user B who is different from the user A by the API, and an endpoint 3010 for the user B is generated. In this case, the endpoint 3010 may perform communication with the endpoint 2010 through the virtual router 1020 and the virtual router 2020. As described above, there is a possibility that communication is performed with an unintended partner according to the reuse of the network connector.

In contrast, according to the embodiment, the unique identifiers are generated for the respective network connectors between the information processing system 1I and the information processing system 2I, and communication is not performed if the identifiers do not coincide with each other. Therefore, communication is not performed with an unintended partner according to the reuse of the network connector.

In addition, according to the embodiment, the network connector is generated and is registered in the connector table (FIG. 9) when the endpoint is generated, and thus, even though the synchronized communication stops, it is possible to reduce the amount of data which is transmitted when the synchronized communication restarts after restoration. Therefore, even in a case of a network whose bandwidth is not wide, it is possible to perform synchronization without giving large influence on another communication. In addition, the synchronized communication after restoration is performed only in a case where an endpoint is generated in an information processing system which does not dispense a connector ID to the network connector, and thus it is possible to avoid performance of a process for the API being deteriorated.

In addition, division is performed on the range of the usable connector ID and synchronization is performed on the respective ranges, and thus it is possible to easily perform synchronization without acquiring exclusive lock.

In addition, even in a case where the synchronized communication stops, connection is established between the endpoints, and thus it is possible to perform communication for the user.

In addition, even in a case where the information processing system on one side stops, it is possible to generate a network connector and an endpoint in an information processing system on the remaining side.

Hereinabove, although the embodiment of the disclosure is described, the disclosure is not limited thereto. For example, there is a case where a functional block configuration of the above-described information processing device 1S does not coincide with an actual configuration of a program module.

In addition, the configuration of each of the tables which are described above is only an example, and the configuration may be different from the above-described configuration. Furthermore, with regard to the processing flow, it is possible to change the orders of the processes if processing results are not changed. Furthermore, the processes may be executed in parallel.

An identifier generation method is not limited to the above-described method. Methods other than the above-described method may be used as long as the generated identifier is unique in the plurality of information processing systems.

The embodiments of the disclosure which are described above are summarized as below.

A first information processing device according to a first aspect of the embodiment includes: (A) a data storage unit (for example, the connector table) configured to store information (for example, the record) for a connection for each connection established between the first information processing device and a second information processing device, (B) a synchronization unit (for example, the synchronization unit 107) configured to synchronize the information stored in the data storage unit with information managed by the second information processing device, (C) a generation unit (for example, the connection management unit 101) configured to generate, in a case where the connection is established between the first information processing device and the second information processing device while synchronization that is performed by the synchronization unit is stopped, unique information between at least the first information processing device and the second information processing device, and transmit the generated unique information to the second information processing device, and (D) a communication unit (for example, the endpoint 1010) configured to establish the connection between the first information processing device and the second information processing device, based on the unique information.

In a case where the connection is established while the synchronization is stopped by the synchronization unit, there is a possibility that communication is performed with an unintended partner due to reuse of the connection, and thus it is not preferable to establish the connection. Here, according to the above-described configuration, the reuse of the connection is not performed, and thus is possible to establish the connection while the synchronization is stopped.

In addition, the generation unit (c1) may generate the unique information, based on identification information of a system including the first information processing device, and a serial number generated in a case where the connection is established between the first information processing device and the second information processing device. However, the unique information may be generated using another method.

In addition, the communication unit (d1) may determine whether or not the unique information generated by the generation unit coincides with unique information received from the second information processing device, and, in a case where it is determined that the unique information generated by the generation unit coincides with the unique information received from the second information processing device, may establish the connection between the first information processing device and the second information processing device. Therefore, communication with an unintended partner is avoided.

In addition, (a1) the information stored in the data storage unit may include identification information of the connection. The generation unit (c2) may calculate a ratio of the number of connections whose identification information are given by the first information processing device, to the number of connections to which the identification information is given among the connections established between the first information processing device and the second information processing device, (c3) may specify a range of the connections, to which the identification information is to be given by the first information processing device, based on the calculated ratio, from among connections to which the identification information is not given in the connections established between the first information processing device and the second information processing device, and (c4), in a case where a connection generation request is received may register, for one connection selected from the specified range, the identification information and the unique information, which are given to the one connection, in the data storage unit. In a case of the above-described configuration, the identification information which may be used by each information processing device is appropriately determined, and thus it is possible to suppress the exhaustion of identification information which is allowed to be used by the information processing device.

In addition, in a case where the synchronization restarts, the synchronization unit (b1) may execute synchronization of information for a connection included in the specified range in parallel with synchronization of information for a connection that is not included in the specified range. Since pieces of information which are not synchronized include information for a connection included in the range and information for a connection which is not included in the range, the synchronization may be effectively performed without acquiring exclusive lock when a process is performed as described above.

In addition, the synchronization unit (b2) may transmit the identification information given by the first information processing device to the connections included in the range, to the second information processing device, (b3) may receive the identification information of a connection, which is not used by the second information processing device for communication in the connections included in the range, from the second information processing device, and (b4) may read information for the connection, to which the received identification information is given, from the data storage unit and may transmit the read information to the second information processing device. The synchronization may be appropriately performed on the information for the connections included in the range.

In addition, the synchronization unit (b5) may receive the identification information given by the second information processing device to the connections, which are not included in the range, from the second information processing device, and (b6) may specify the identification information of the connection, which is not used by the first information processing device for communication, in the received identification information from the data storage unit and may transmit the specified identification information to the second information processing device. The synchronization may be appropriately performed on the information for the connections which are not included in the range.

An information processing method according to a second aspect of the embodiment includes a process of: (E) generating unique information between at least a first computer and a second computer in a case where a connection is established between the first computer and the second computer while synchronization, which is performed between information stored in a data storage unit configured to store information for the connection for each connection established between the first computer and the second computer, and information managed by the second computer, is stopped, (F) transmitting the generated unique information to the second computer, and (G) establishing the connection between the first computer and the second computer, based on the unique information.

It is possible to prepare a program which causes a processor to execute a process according to the method, and the program is stored in, for example, a computer-readable storage medium or a storage device, such as a flexible disk, a CD-ROM, a magneto-optic disk, a semiconductor memory, or a hard disk. Also, an intermediate processing result is temporally stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first apparatus, comprising:
   a memory configured to store first connection information in association with each of plural connections established between the first apparatus and a second apparatus, each piece of the first connection information including identification information that identifies a connection of the plural connections; and
   a processor coupled to the memory and configured to:
      synchronize the first connection information stored in the memory with second connection information that is managed by the second apparatus;
      when a connection is to be established between the first apparatus and the second apparatus while synchronization of the first connection information performed by the processor is suspended, generate first unique information that is unique at least between the first apparatus and the second apparatus, and transmit the generated first unique information to the second apparatus;
      establish, based on the first unique information, the connection between the first apparatus and the second apparatus;
      calculate a ratio of a first number of connections that are provided with the identification information by the processor and are established between the first apparatus and the second apparatus, to a second number of connections that are provided with the identification information by the processor;
      specify, based on the calculated ratio, a range of connections whose identification information is allowed to be given by the processor, among connections whose identification information is not given and are established between the first apparatus and the second apparatus; and
      register in the memory, upon receiving a connection generation request register the identification information given to one of connections selected from the specified range and the first unique information.

2. The first apparatus of claim 1, wherein the processor is further configured to generate the first unique information, based on system identification information of a system including the first apparatus, and a serial number generated when establishing a connection between the first apparatus and the second apparatus.

3. The first apparatus of claim 1, wherein the processor is further configured to:
   determine whether the first unique information coincides with second unique information that is generated by the second apparatus and received from the second apparatus; and
   when the first unique information coincides with the second unique information, establish the connection between the first apparatus and the second apparatus.

4. The first apparatus of claim 1, wherein the processor is further configured to, when restarting the synchronization of the first connection information, execute synchronization of the first connection information for connections included in the specified range, in parallel with synchronization of the first connection information for connections that are not included in the specified range.

5. The first apparatus of claim 4, wherein the processor is further configured to:
   transmit the identification information that is given by the processor to the connections included in the specified range, to the second apparatus;
   receive the identification information for connections that are included in the specified range and are not used by the second apparatus for communication, from the second apparatus; and
   read, from the memory, the first connection information for connections having the received identification information, and transmit the read information to the second apparatus.

6. The first apparatus of claim 4, wherein the processor is further configured to:
   receive the identification information for connections whose identification information is not included in the specified range and is given by the second apparatus; and
   specify, from the memory, pieces of identification information for connections that are not used by the first apparatus for communication, among pieces of identification information included in the received identification information, and transmit the specified identification information to the second apparatus.

7. A method performed by a first computer, the method comprising:
   providing the first computer with a memory that stores first connection information ii association with each of plural connections established between the first computer and a second computer, each piece of the first connection information including identification information that identifies a connection of the plural connections;
   synchronizing the first connection information stored in the memory with second connection information that is managed by the second computer;
   when a connection is to be established between the first computer and the second computer while synchronization of the first connection information performed by the first computer is suspended, generating first unique information that is unique at least between the first computer and the second computer, and transmitting the generated first unique information to the second computer;

establishing, based on the first unique information, the connection between the first computer and the second computer;

calculating a ratio of a first number of connections that are provided with the identification information by the processor and are established between the first computer and the second computer, to a second number of connections that are provided with the identification information by the processor;

specifying, based on the calculated ratio, a range of connections whose identification information is allowed to be given by the processor, among connections whose identification information is not given and are established between the first computer and the second computer; and registering in the memory, upon receiving a connection generation request, register the identification information given to one of connections selected from the specified range and the first unique information.

8. A non-transitory, computer-readable recording medium having stored therein a program for causing a first computer to execute a process comprising:

providing the first computer with a memory that stores first connection information in association with each of plural connections established between the first computer and a second computer, each piece of the first connection information including identification information that identifies a connection of the plural connections;

synchronizing the first connection information stored in the memory with second connection information that is managed by the second computer;

when a connection is to be established between the first computer and the second computer while synchronization of the first connection information performed by the first computer is suspended, generating first unique information that is unique at least between the first computer and the second computer, and transmitting the generated first unique information to the second computer;

establishing, based on the first unique information, the connection between the first computer and the second computer;

calculating a ratio of a first number of connections that are provided with identification information by the processor and are established between the first computer and the second computer, to a second number of connections that are provided with the identification information by the processor;

specifying, based on the calculated ratio, a range of connections whose identification information is allowed to be given by the processor, among connections whose identification information is not given and are established between the first computer and the second computer; and registering in the memory, upon receiving a connection generation request, register the identification information given to one of connections selected from the specified range and the first unique information.

9. A system, comprising:

a first apparatus including a memory and a first processor coupled to the memory; and a second apparatus including a second processor, wherein the memory is configured to store first connection information in association with each of connections established between the first apparatus and the second apparatus each piece of the first connection information includes identification information that identifies a connection of the plural connections, the first processor is configured to:
synchronize the first connection information stored in the memory with second connection information that is managed by the second apparatus, and when a connection is to be established between the first apparatus and the second apparatus while synchronization of the first connection information performed by the processor is suspended, generate first unique information that is unique at least between the first apparatus and the second apparatus; and transmit the generated first unique information to the second apparatus, the first processor of the first apparatus and the second processor of the second apparatus are configured to establish, based on the first unique information, the connection between the first apparatus and the second apparatus, and the first processor is further configured to:
calculate a ratio of a first number of connections that are provided with the identification information by the processor and are established between the first apparatus and the second apparatus, to a second number of connections that are provided with the identification information by the processor;

specify, based on the calculated ratio, a range of connections whose identification information is allowed to be given by the processor, among connections whose identification information is not given and are established between the first apparatus and the second apparatus; and register in the memory, upon receiving a connection generation request, register the identification information given to one of connections selected from the specified range and the first unique information.

* * * * *